US012810011B2

(12) United States Patent
Elad et al.

(10) Patent No.: US 12,810,011 B2
(45) Date of Patent: Nov. 24, 2026

(54) SNOOP FILTERING

(71) Applicant: Arm Limited, Cambridge (GB)

(72) Inventors: Yuval Elad, Cambridge (GB); Jason Parker, Sheffield (GB); Alexander Donald Charles Chadwick, Cambridge (GB)

(73) Assignee: Arm Limited, Cambridge (GB)

( * ) Notice: Subject to any disclaimer, the term of this patent is extended or adjusted under 35 U.S.C. 154(b) by 80 days.

(21) Appl. No.: 19/059,877

(22) Filed: Feb. 21, 2025

(65) Prior Publication Data

US 2025/0190609 A1 Jun. 12, 2025

(30) Foreign Application Priority Data

Feb. 27, 2024 (GB) ...................................... 2402746

(51) Int. Cl.
*G06F 21/60* (2013.01)
*G06F 12/0831* (2016.01)
*G06F 21/62* (2013.01)

(52) U.S. Cl.
CPC ........ *G06F 21/6218* (2013.01); *G06F 21/602* (2013.01)

(58) Field of Classification Search
CPC ............... G06F 21/6218; G06F 21/602; G06F 12/0893; G06F 12/0646; G06F 12/0877; G06F 12/1491; G06F 12/0831
(Continued)

(56) References Cited

U.S. PATENT DOCUMENTS

2008/0147992 A1 6/2008 Raikin et al.
2011/0208907 A1 8/2011 Raikin et al.
(Continued)

FOREIGN PATENT DOCUMENTS

GB 2593485 A 9/2021
GB 2618128 A 11/2023

OTHER PUBLICATIONS

International Search Report for International application No. GB2402746.8, dated Sep. 2, 2024.
(Continued)

*Primary Examiner* — Jared I Rutz
*Assistant Examiner* — Wei Ma
(74) *Attorney, Agent, or Firm* — NIXON & VANDERHYE P.C.

(57) ABSTRACT

An apparatus comprises request receiving circuitry to receive a given memory system request specifying a target address in a given physical address space and a target memory encryption context identifier (MECID) indicative of a selected memory encryption context associated with the memory system request. Snoop filtering circuitry determines whether a snoop request is to be transmitted to a given caching agent in response to the given memory system request. The snoop filtering circuitry determines, based on the target MECID of the given memory system request and on snoop filtering information associated with the given caching agent, whether the target MECID is a snoop-not-required MECID for the given caching agent. In response to determining that the target MECID is a snoop-not-required MECID for the given caching agent, the snoop filtering circuitry suppresses transmission of a snoop request to the given caching agent in response to the given memory system request.

23 Claims, 17 Drawing Sheets

(58) Field of Classification Search
USPC .......................................................... 711/146
See application file for complete search history.

(56) References Cited

U.S. PATENT DOCUMENTS

| | | | | |
|---|---|---|---|---|
| 2017/0004084 | A1 | 1/2017 | Kim et al. | |
| 2020/0042446 | A1* | 2/2020 | Mittal ................. | G06F 12/0815 |
| 2022/0156195 | A1* | 5/2022 | Palfer-Sollier ...... | G06F 12/0833 |
| 2022/0308999 | A1* | 9/2022 | Randall ............... | G06F 12/0831 |
| 2025/0190371 | A1* | 6/2025 | Parker ................. | G06F 12/1466 |

OTHER PUBLICATIONS

"Learn the architecture—Realm Management Extension," Arm Limited, p. 1-43, 2021.

* cited by examiner

MECIDx is snoop-not-required MECID
for caching agent y if MECID hits
in snoop filter information and
SF (MECIDx, CAy) = 0

SNOOP FILTERING

This application claims the benefit of and priority to Great Britain Application Number 2402746.8, which was filed on Feb. 27, 2024, the content of which are hereby incorporated by reference in their entirety.

The present technique relates to the field of snoop filtering.

A data processing system may comprise caching agents capable of caching data from shared memory. A coherency protocol may be used to maintain coherency between data cached at the respective caching agents. When one caching agent requests read/write access to data for a given address, this may trigger snoop requests to be sent to one or more other caching agents to check whether data is held for that address at the other caching agents and/or prompt changes in coherency state of the data held at other caching agents (e.g. triggering invalidation of cached data or return of a dirty data value held by another caching agent). As the number of caching agents increases, broadcasting snoop requests to each other caching agent can be extremely expensive in terms of bandwidth and may slow down performance by blocking processing of other requests, and so snoop filtering circuitry may be provided to at least partially track information about the addresses for which data is cached at a particular caching agent, so that some snoop requests can be suppressed if it is known that certain caching agents do not hold data for the relevant address.

At least some examples of the present technique provide an apparatus comprising: request receiving circuitry to receive a given memory system request specifying a target address in a given physical address space and a target memory encryption context identifier indicative of a selected memory encryption context associated with the memory system request, the selected memory encryption context comprising one of a plurality of memory encryption contexts associated with the given physical address space; and snoop filtering circuitry to determine whether a snoop request is to be transmitted to a given caching agent in response to the given memory system request; in which: the snoop filtering circuitry is configured to: determine, based on the target memory encryption context identifier of the given memory system request and on snoop filtering information associated with the given caching agent, whether the target memory encryption context identifier is a snoop-not-required memory encryption context identifier for the given caching agent; and in response to determining that the target memory encryption context identifier is a snoop-not-required memory encryption context identifier for the given caching agent, suppressing transmission of a snoop request to the given caching agent in response to the given memory system request.

At least some examples of the present technique provide a system comprising: the apparatus described above, implemented in at least one packaged chip; at least one system component; and a board, wherein the at least one packaged chip and the at least one system component are assembled on the board.

At least some examples of the present technique provide a chip-containing product comprising the system described above assembled on a further board with at least one other product component.

At least some examples of the present technique provide computer-readable code for fabrication of an apparatus comprising: request receiving circuitry to receive a given memory system request specifying a target address in a given physical address space and a target memory encryption context identifier indicative of a selected memory encryption context associated with the memory system request, the selected memory encryption context comprising one of a plurality of memory encryption contexts associated with the given physical address space; and snoop filtering circuitry to determine whether a snoop request is to be transmitted to a given caching agent in response to the given memory system request; in which: the snoop filtering circuitry is configured to: determine, based on the target memory encryption context identifier of the given memory system request and on snoop filtering information associated with the given caching agent, whether the target memory encryption context identifier is a snoop-not-required memory encryption context identifier for the given caching agent; and in response to determining that the target memory encryption context identifier is a snoop-not-required memory encryption context identifier for the given caching agent, suppressing transmission of a snoop request to the given caching agent in response to the given memory system request.

At least some examples provide a storage medium storing the computer-readable code. The storage medium may be a non-transitory storage medium.

At least some examples provide a method comprising: receiving a given memory system request specifying a target address in a given physical address space and a target memory encryption context identifier indicative of a selected memory encryption context associated with the memory system request, the selected memory encryption context comprising one of a plurality of memory encryption contexts associated with the given physical address space; determining, based on the target memory encryption context identifier of the given memory system request and on snoop filtering information associated with a given caching agent, whether the target memory encryption context identifier is a snoop-not-required memory encryption context identifier for the given caching agent; and in response to determining that the target memory encryption context identifier is a snoop-not-required memory encryption context identifier for the given caching agent, suppressing transmission of a snoop request to the given caching agent in response to the given memory system request.

Further aspects, features and advantages of the present technique will be apparent from the following description of examples, which is to be read in conjunction with the accompanying drawings, in which.

Figure 1:
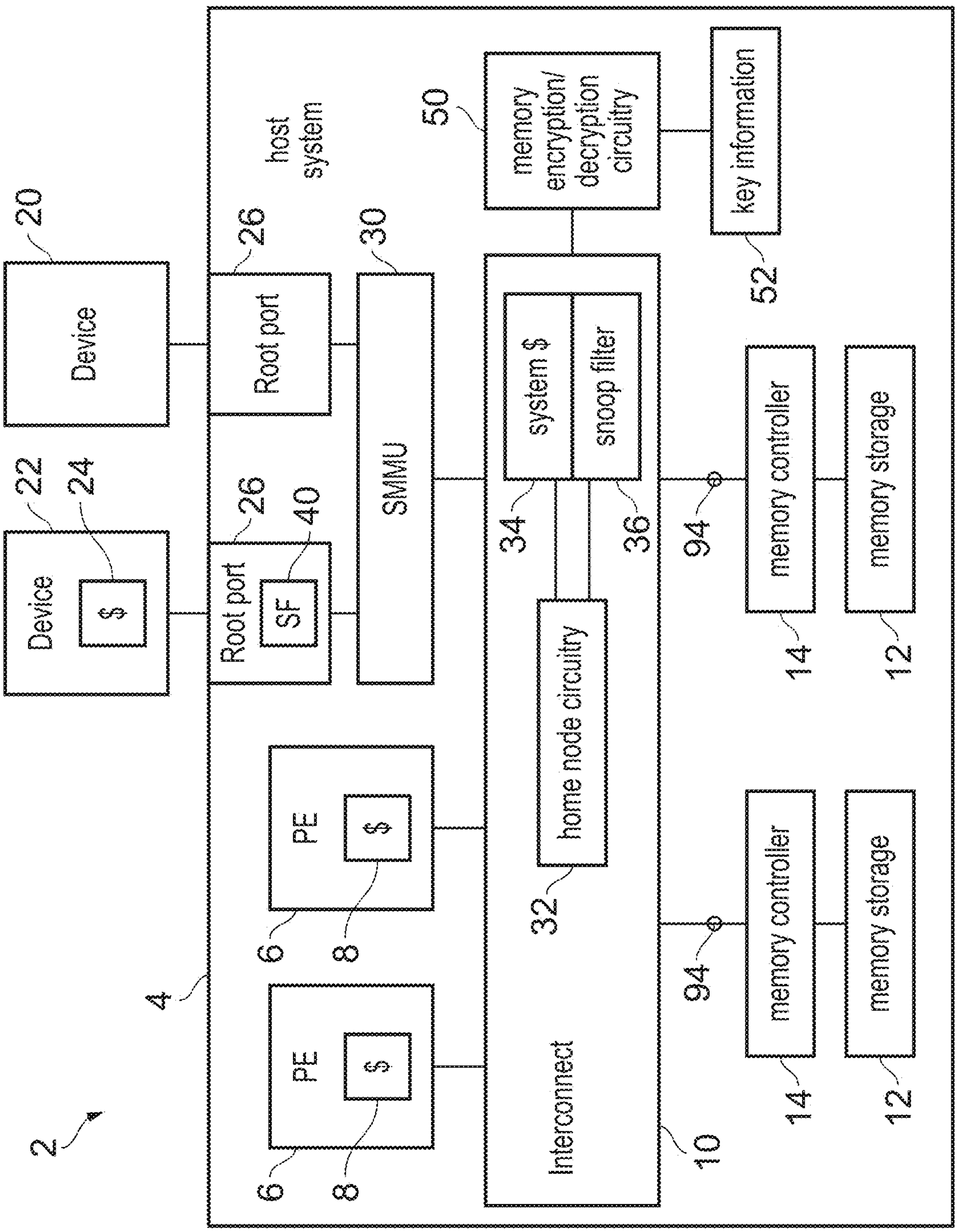
FIG. 1 illustrates an example of a data processing system comprising snoop filtering circuitry.

Some data processing systems may support the ability to assign, to a given memory system request requesting a memory access to a target address in a given physical address space, a target memory encryption context identifier (MECID) which indicates a selected memory encryption context associated with the memory system request. The MECID distinguishes the selected memory encryption context from other encryption contexts associated with the given physical address space. Use of MECIDs can be useful to enable different subsets of physical addresses within a given physical address space to be treated differently for the purpose of handling encryption/decryption of data stored in a memory system, to provide for confidentiality of data stored by different software processes coexisting in the same physical address space.

The inventors have recognised that MECIDs can be useful information for filtering snoop requests sent to at least one caching agent in a data processing system, since the MECID can be a proxy for identifying a given software workload. The MECID-based snoop filtering information can be used either instead of, or in addition to, use of address-based snoop filtering information looked up based on the physical address of the memory access. Use of MECID-based snoop filtering allows, for a given level of performance in reduction of unnecessary transmission of snoop requests, a reduction in the amount of snoop filter state used for coherency tracking at the snoop filtering circuitry compared to a purely address-based snoop filtering scheme, since a single entry associated with a given MECID can be used to filter out snoop requests for many physical addresses associated with that MECID, rather than needing individual snoop filter entries per physical address. Hence, using MECIDs for snoop filtering can enable a more circuit-area-efficient snoop filter design than purely address-based snoop filtering approaches.

Hence, an apparatus comprises request receiving circuitry to receive a given memory system request specifying a target address in a given physical address space and a target memory encryption context identifier (MECID) indicative of a selected memory encryption context associated with the memory system request, the selected memory encryption context comprising one of a plurality of memory encryption contexts associated with the given physical address space; and snoop filtering circuitry to determine whether a snoop request is to be transmitted to a given caching agent in response to the given memory system request. The snoop filtering circuitry is configured to: determine, based on the target MECID of the given memory system request and on snoop filtering information associated with the given caching agent, whether the target MECID is a snoop-not-required MECID for the given caching agent; and in response to determining that the target MECID is a snoop-not-required MECID for the given caching agent, suppressing transmission of a snoop request to the given caching agent in response to the given memory system request. By suppressing transmission of a snoop request when the MECID is determined to be a snoop-not-required MECID, this can improve performance, not only because the bandwidth that would otherwise be consumed by the suppressed snoop request can be used for other requests, but also because a memory system request that would depend on a response to the suppressed snoop request can be serviced earlier if the latency of the given caching agent responding to the suppressed snoop request can be eliminated. By using MECIDs to handle snoop filtering, a snoop filter with a given amount of circuit area budget for storing and maintaining snoop filter state information can achieve a greater amount of suppression of unnecessary snoop requests, to provide improved performance in comparison to a purely physical address-based snoop filter with an equivalent circuit area budget.

The MECID-based snoop filtering approach can be applied in any system where memory system requests can be tagged with MECIDs and coherency is to be maintained between data cached at respective caching agents.

However, the use of MECIDs for snoop filtering may be particularly useful where the given caching agent comprises a coherent device. In the field of memory systems, the term "device" may refer to non-CPU circuitry capable of issuing memory access requests to the memory system of a host system comprising at least one processor capable of instruction execution (e.g. a central processing unit (CPU) or graphics processing unit (GPU)). For example, the device could be an I/O (input/output) device or hardware accelerator. The host system may not be able to trust that the device design has been validated by the same provider as the provider of the host system, as the same host system design could be used in combination with a diverse range of devices. In some cases, devices may be external to the chip(s) implementing the host system and may be coupled to the host via an interface such as a PCIe® (Peripheral Component Interconnect Express) interface. While some devices may not be capable of acting as caching agents (so need to be coherent with the host system only in the sense that the memory access requests issued by the device cause the latest version of data held at other caching agents to be used for servicing those requests), there is increasing use of fully coherent devices having their own private cache which is to be kept coherent with data within the host system.

Hence, the coherent device may itself act as a caching agent that is part of the coherency protocol, which may potentially need to be snooped to identify whether it holds data for a target address subject to a read/write request from another source of memory access requests. However, the inventors recognised that snoop traffic to a coherent device may cause a security risk as the snoop requests may leak information on address access patterns made by other requesters, which could be exploited by attackers aiming to compromise sensitive software running on the host system. Also, as the validation of device designs may be outside the control of the provider of the host system, an attacker could implement a rogue device which issues fake responses to snoop requests (e.g. returning bogus data purporting to be the latest dirty data value for a given address), which could potentially compromise data stored in shared memory and cause incorrect functioning or other security violations for sensitive software executing on the host system.

Therefore, to improve security, it may be desirable to be able to prevent snoop requests being sent to a given coherent device when that coherent device does not hold any data for the target address of the snoop request. Maintaining a precise record of which physical addresses are cached at the given coherent device may be unacceptably expensive in terms of circuit area and power overhead. However, by using MECIDs to track what information is cached at the coherent device, the overhead can be greatly reduced, as a single MECID-based tracking entry may serve to track a larger set of physical addresses cached at the device. Hence, when MECID-based snoop filtering is used in conjunction with a coherent device, this can provide a security benefit and greatly reduce the circuit area cost of the snoop filter compared to purely physical address based snoop filtering.

In some examples, the coherent device may be a device compatible with the CXL® (Compute Express Link®) protocol, which is a cache-coherent interconnect protocol that supports use of fully coherent devices. It will be appreciated that other coherency protocols could also be used.

The request receiving circuitry and snoop filtering circuitry may be implemented at different locations within a processing system, depending on implementation choice. The component which comprises the request receiving circuitry and snoop filtering circuitry may be a stand-alone sub-system within the overall data processing system. The sub-system comprising the request receiving circuitry and snoop filtering circuitry could be licensed for manufacture independently from other parts of the data processing system (regardless of whether the sub-system is on a different chip to other components of the data processing system or on the same integrated circuit as other components of the data processing system, the sub-systems may nevertheless be licensed independently). Therefore, the caching agents themselves and other system elements (such as processing circuitry (e.g. a CPU) for assigning MECIDs to be used for certain memory access requests or home node circuitry for generating snoop requests) do not always need to be present in the same component as the request receiving circuitry and snoop filtering circuitry.

In some examples, the request receiving circuitry and snoop filtering circuitry may be implemented on a path via which snoop traffic is routed from home node circuitry to the given caching agent. Hence, the given memory system request received by the request receiving circuitry may comprise a snoop request targeting the given caching agent.

In this case, the home node circuitry which issued the snoop request may be expecting a response to the snoop request, even if the snoop filtering circuitry determines that transmission of the snoop request to the given caching agent is to be suppressed. Hence, in response to determining that the target MECID is a snoop-not-required MECID for the given caching agent, the snoop filtering circuitry may return a no-data response in response to the snoop request, the no-data response indicating that a private cache of the given caching agent does not hold valid data for the target address. By synthesizing a no-data response, without actually forwarding the snoop request to the given caching agent to query the coherency state of data for the target address at the given caching agent, system performance can be improved as the latency of the given caching agent responding to the snoop request can be eliminated from the time taken for the home node circuitry to receive the required snoop response, enabling memory access requests which depend on snoop resolution on average to be processed earlier (the actual latency of the memory access request may also depend on outcomes of other snoops on which the memory access requests depend, but on average the latency can be reduced by the MECID-based snoop filtering because the number of caching agents for which snoop responses are awaited can be reduced).

Although such MECID-based snoop filtering could be implemented that any point on the path taken by snoop requests to a coherent device, it can be useful to implement the snoop filtering circuitry at a port for connecting a host system to one or more devices. The port acts as a gateway for memory access requests/responses entering the host system from the associated devices and requests/responses transmitted from the host system to the associated device(s), and so can be a convenient point at which request traffic for a set of one or more devices can be monitored for maintaining the snoop filtering information and at which snoop requests for the associated set of devices can be intercepted and suppressed.

Some examples may (in addition to snoop filtering at ports for devices, or instead of snoop filtering device at ports for devices) provide the snoop filtering circuitry at home node circuitry which manages coherency for a plurality of caching agents. The home node circuitry may be the source of the snoop requests sent to each of caching agent subject to a coherency scheme. For examples where the request receiving circuitry and snoop filtering circuitry are located at the home node circuitry, the given memory system request may comprise a read/write request received from a requesting caching agent. Hence, for implementations where the MECID-based snoop filtering is implemented at the home node circuitry, in response to the given memory system request (read/write request), the snoop filtering circuitry may determine based on the snoop filtering information a snoop-not-required subset of the caching agents for which the target MECID is a snoop-not-required MECID, and suppress transmission of snoop requests to the snoop-not-required subset of caching agents in response to the given memory system request.

For home node based snoop filters using MECID-based snoop filtering information, the MECID-based snoop filtering information may not be the only type of snoop filtering information provided. The snoop filtering circuitry may also look up address-based snoop filtering information based on the target address of the given memory system request, to identify whether the target address is a snoop-required target address for the given caching agent. Sometimes, due to lack of information available to the home node circuitry or imprecision in the tracking provided by the snoop filtering information, it may be the case that the MECID-based snoop filtering information may not indicate whether the target MECID has data held at a particular caching agent, but the address-based snoop filtering information does indicate that the target address has information cached at that caching agent. In this case, the address-based snoop filtering circuitry may take priority, to ensure that coherency of any data cached at the caching agent for the target address can be maintained. Therefore, in response to determining that the target address is a snoop-required target address for the given caching agent, the snoop filtering circuitry may determine that a snoop request should be transmitted to the given caching agent in response to the given memory system request, even when the snoop filtering information is indicative of the target MECID is a snoop-not-required MECID for the given caching agent.

A wide variety of approaches are possible for maintaining the MECID-based snoop filtering information, which can vary in the precision with which the snoop filtering information tracks which MECIDs are cached at a given caching agent.

Some approaches may aim to precisely track each MECID which has data cached in a given coherency state (e.g. unique coherency state) at a given caching agent. For example, if the aim is to improve security by reducing likelihood of snoop requests being sent to a coherent device relating to a software context which does not require use of that device, it may be desirable to precisely track all the MECIDs which have data held in a particular coherency state (e.g. unique coherency state) at the coherent device.

In some examples, the snoop filtering information may specify one or more MECIDs which cannot be regarded as a snoop-not-required MECID for the given caching agent (for example, because those MECIDs have been detected as having been specified for requests to allocate data to the given caching agent's private cache). In this case, a MECID other than those MECIDs indicated in the snoop filtering information could be regarded as a snoop-not-required MECID. This approach can be useful for improving security by reducing unnecessary snoop traffic to a coherent device, as in practice the number of MECIDs for which data is cached at that device may be relatively limited and so it can be practical to maintain a precise record of each MECID with data held at the coherent device.

With the approach where the snoop filtering information contains a record of those MECIDs which are not snoop-not-required MECIDs, any other MECID may be considered a snoop-not-required MECID. Hence, if a given MECID is looked up against the snoop filtering information and a miss is detected, the given MECID may be assumed to be a snoop-not-required MECID, and so transmission of a snoop request specifying the given MECID to the given caching agent may be suppressed.

On the other hand, other examples may use a different approach, where the MECID-based snoop filtering information could for example track a set of MECIDs known to be snoop-not-required MECIDs for a given caching agent, or provide tracking information for a set of MECIDs, the tracking information for each MECID indicating whether or not that MECID is a snoop-not-required MECID for the given caching agent.

For example, this could be useful for the home node based snoop filtering approach, where once a given MECID is detected as being in use for one caching agent, the snoop filtering circuitry can track whether that MECID is seen for any requests allocating data to caches of other caching agents, and so for a given one of those other caching agents not having seen any requests tagged with the given MECID, the given MECID can be identified as a snoop-not-required MECID. In practice, it may not be practical for the snoop filtering circuitry to track such information for every possible value of the MECID, and so on some occasions a lookup of the MECID-based snoop filtering information for a target MECID may detect a miss when there is no valid information specifying whether the target MECID is a snoop-not-required MECID for a given caching agent. With this approach, on a miss in the MECID-based snoop information it may be assumed that it is unknown whether data for the target address and the target MECID is cached at the given caching agent, and so in the absence of any specific indication that the required data is not cached at the given caching agent, the snoop request may still be transmitted to the given caching agent. Nevertheless, the MECID-based snoop filtering allows some instances of snoop requests to be filtered out when it is detected that a given MECID definitely does not have any data cached at a given caching agent.

Hence, in scenarios when the target MECID is looked up in the snoop filtering information but no stored information is found for that target MECID, the response taken can vary depending on the implementation. In use cases (e.g. with snoop filtering applied for security reasons at a port associated with a coherent device) where the snoop filtering information tracks MECIDs for which snoops are required for the given caching agent, the miss in the snoop filtering information for a target MECID may cause the snoop request to be suppressed from being sent to the given caching agent. In use cases (e.g. with snoop filtering applied at the home node) where the snoop filtering information may identify, for a subset of MECIDs, which caching agents hold data for those MECIDs, then if there is a miss in the snoop filtering information for a target MECID, unless address-based snoop filtering can be used to filter out the snoop request, the snoop request may be broadcast to all caching agents (although it may then be subject to further snoop filtering at a port to a coherent device if the port-based snoop filtering is also implemented).

The snoop filtering information can be maintained in different ways. In some examples, the snoop filtering information comprises software-managed snoop filtering information. Particularly in examples where the MECID-based snoop filtering is implemented at a port for a device, hardware circuitry for maintaining the snoop filtering information indicating which MECIDs have data cached at a given device may not be considered justified, as typically the number of MECIDs in use for a given device may be small and may be entirely known to software running on the data processing system (e.g. privileged software which may have configured the device to give it access to the portions of address space associated with use of a particular MECID). Hence, by providing a software programming interface by which software is able to configure the snoop filtering information to define which MECIDs are snoop-not-required MECIDs for a given caching agent, the complexity of the snoop filtering circuitry can be reduced as there is no need to provide hardware monitoring circuitry to monitor requests to identify MECIDs in use at a given caching agent.

Hence, the snoop filtering circuitry may comprise programming interface circuitry to set the software-managed snoop filtering information in response to a programming request triggered by privileged software. For example, the programming interface may comprise a set of memory-mapped registers storing the snoop filtering information, where those memory-mapped registers can be exposed to software at certain addresses within a given memory address space. Alternatively, the programming interface may not expose the snoop filtering information to software directly, but can expose a request buffer or other programming interface data structure in the address space accessible to software. When software writes a programming request to the request buffer or other programming data structure, some hardware circuitry could respond to the programming request to update the snoop filtering information according to the information specified in the programming request. For example, the programming request may identify one or more MECIDs to be specified as being authorized for use with the given caching agent, so that those MECIDs would not be regarded as snoop-not-required MECIDs, or may identify one or more MECIDs previously specified as not being snoop-not-required MECIDs which should be removed from the list of authorized (not snoop-not-required) MECIDs. Access to the programming interface may in some examples be restricted to privileged software (with unprivileged software unable to program the snoop filtering information). For example, this access control can be implemented based on page table structures which may control whether the addresses mapped to the programming interface are accessible to less privileged software.

In some examples, the snoop filtering information comprises hardware-managed snoop filtering information set by the snoop filtering circuitry based on monitoring of request traffic for the given caching agent. By providing hardware for monitoring request traffic and deducing which MECIDs are in use for a given caching agent, this reduces the responsibility of software to track this information and so can make software development simpler.

One way of implementing hardware-managed snoop filtering information can be to provide a counter for tracking, for at least a subset of MECIDs, the number of cache lines held at a given caching agent for those MECIDs. Request traffic to the given caching agent may be monitored to update the snoop filtering information in response to detection of allocation of new lines in the private cache of the given caching agent, or invalidations of previously allocated lines from the given caching agent's private cache. Hence, in some examples, the snoop filtering circuitry may determine that the target MECID is a snoop-not-required MECID for the given caching agent, in response to determining that a cache line counter associated with the target MECID and the given caching agent indicates that a private cache of the given caching agent holds a non-zero number of cache lines associated with the target MECID.

In some examples, the cache line counter may track valid cache lines for a given MECID that are held in the given caching agent's private cache.

Other examples may support tracking valid cache lines for a restricted subset of coherency states (not necessarily all valid cache lines, if there are some coherency states for which no snoop would be needed due to specific details of the implemented coherency protocol). For example, in some examples, the cache line counter may count the number of valid cache lines for a given MECID that are in a unique coherency state which indicates that no other caching agent holds valid data for the cache line in its private cache. In this case, the snoop filtering circuitry may maintain, for the given caching agent, a set of cache line counters each associated with a corresponding MECID. In response to detecting a request to allocate a cache line associated with a specified MECID to a private cache of the given caching agent in the unique coherency state, the snoop filtering circuitry is configured to adjust the cache line counter corresponding to the specified MECID in a first direction (e.g. the counter being incremented or decremented). In response to detecting an indication that a cache line associated with a specified MECID has transitioned from the unique coherency state to a non-unique (e.g. shared or invalid) coherency state in the private cache of the given caching agent, the snoop filtering circuitry may adjust the cache line counter corresponding to the specified MECID in a second direction (opposite to the direction in which the counter is adjusted in the first direction). This approach can be a relatively simple to implement scheme for enabling hardware to monitor request traffic to maintain MECID-based snoop filtering information, to reduce the responsibility of software to track which MECIDs are used by each device.

Such counter-based snoop filtering information may not always be precise. The snoop filtering circuitry may not always receive indications from the caching agent every time a transition of coherency state occurs for data associated with a MECID being tracked in the snoop filtering information. For example, sometimes a given caching agent may silently invalidate data at its cache without informing the snoop filtering circuitry. Hence, the snoop filtering information may sometimes be imprecise, but the imprecision may be limited so that false positive detection of presence of unique cache lines in the private cache of the given caching agent may be allowed, but it may not be possible to have a false negative detection of absence of unique cache lines in the private cache of the given caching agent when the cache line is actually held in the unique state at the private cache of the given caching agent. Meeting this level of precision can be achievable in practice because the transitions to a unique state may generally be based on explicit read/write requests from the given caching agent itself, which will require explicit signals to be sent to the home node and so are easily detectable, whereas the transitions of a cache line for a given address from the unique state to another coherency state (e.g. invalid) may sometimes be prompted internally at the given caching agent without any need for a signal to be issued to the home node, so may not always be communicated to the snoop filtering circuitry.

In some examples, the snoop filtering information for the given caching agent comprises a set of snoop filtering indicators each associated with a respective MECID and indicating whether that MECID is a snoop-not-required MECID for the given caching agent. For example, the snoop filtering indicators may comprise a bitmap where each bit indicates whether a corresponding MECID is a snoop-not-required MECID for a particular caching agent. This can be a relatively simple way of implementing an indication of each MECID which is in use or is not in use for a given caching agent.

In some examples, the snoop filtering information comprises a set of MECID tracking entries for the given caching agent. Each MECID tracking entry, when valid, may specify a corresponding MECID and information indicative of whether the corresponding MECID is a snoop-not-required MECID for the given caching agent. For example, the information indicating whether the corresponding MECID is a snoop-not-required MECID could be any of:

- a valid indicator, which if set to indicate that the MECID tracking entry is valid implicitly indicates that the corresponding MECID is not a snoop-not-required MECID for the given caching agent;
- a set of indicators provided per caching agent or group of caching agents, which indicates for each caching agent or group of caching agents whether, for that caching agent or group of caching agents, the corresponding MECID is a snoop-not-required MECID; or
- a cache line counter such as the one discussed above, which tracks the number of valid cache lines (either valid cache lines in any coherency state that is valid, or specifically cache lines in a specified coherency state such as the Unique state mentioned above) held at the private cache of a given caching agent for the corresponding MECID.

Regardless of the exact form of the tracking information associated with the MECID tracking entry, in examples where the number of encodable MECID values is too large to justify storing information for every possible MECID, this approach could help reduce the amount of snoop filter state by recording valid entries only for a subset of MECIDs (each entry specifying the MECID allocated to that entry).

If the snoop filtering information does not have sufficient capacity to track snoop filtering information for every encodable MECID at a given time, then from time to time the snoop filtering circuitry may reallocate which MECIDs are allocated valid MECID tracking entries.

For example, in response to detecting a request capable of allocating data associated with a new MECID to a private cache of the given caching agent, when the new MECID is not already tracked using one of the set of memory encryption context tracking entries, the snoop filtering circuitry may allocate one of the MECID tracking entries for the new MECID.

If such new allocation requires eviction of a previously used MECID tracking entry, then this could be handled in different ways depending on the use case.

For examples such as the home node based MECID snoop filter, where a default is applied where on a miss in the MECID-based snoop filtering information (and in absence of any other reason to deduce that the snoop can be filtered out for a given caching agent) the snoop request should be sent to that given caching agent, then it may be acceptable simply to discard the information from a victim MECID tracking entry that is selected for replacement with information for a newly allocated MECID.

However, in examples where the MECID-based snoop filtering information is more precise and is used to track each MECID which does have data cached at the given caching agent (e.g. in the port-based snoop filter approach used to reduce snoop traffic to a coherent device for security reasons), then the default may be to suppress snoops if there is a miss in the lookup of the MECID-based snoop filtering information. In this case, simply discarding information from a victim MECID tracking entry may risk loss of coherency if data for an address that is cached at the given caching agent is not snooped when another caching agent requires access to the data. Hence, in some examples, in response to detecting that allocating one of the MECID tracking entries for the new MECID requires replacement of a MECID tracking entry previously allocated for a victim MECID, the snoop filtering circuitry may trigger invalidation of any cache lines associated with the victim MECID from a private cache of the given caching agent. For example, the snoop filtering circuitry may issue a single invalidation bus command to the given caching agent specifying a given MECID (corresponding to the victim MECID whose tracking entry was reallocated for the new MECID). The bus command (generated by hardware when the replacement policy determines that a valid MECID tracking entry should be evicted) requests that the given caching agent acts upon that request by invalidating any cache line associated with the given MECID (regardless of which physical address is associated with the invalidated cache line having that MECID).

The apparatus may comprise memory encryption/decryption circuitry responsive to a memory access request specifying a given address and a specified MECID, to perform encryption or decryption of data associated with the given address based on key information selected based on the specified MECID. For example, the key information could be an encryption/decryption key, or could be a key modifier or tweak which is used in an encryption/decryption algorithm to modify a separate encryption/decryption key (the modifier or tweak having fewer bits than the key itself). Hence, by selecting key information using the MECID, data associated with different MECIDs can be encrypted/decrypted differently so that the same data value may be represented differently in memory when written to memory by requests associated with different MECIDs.

Specific examples are set out below with reference to the drawings.

FIG. 1 schematically illustrates an example of a data processing system 2. The data processing system 2 comprises a host system 4, which could be implemented as a system-on-chip or as a set of multiple interconnected chiplets. The host system 4 comprises one or more processing elements (processors) 6. Each processor 6 could, for example, be a central processing unit (CPU), graphics processing unit (GPU), neural processing unit (NPU), or any other processor capable of instruction execution. Each processing element 6 may include at least one private cache 8 for caching data obtained from memory storage 12 via an interconnect 10. Each memory storage unit 12 has an associated memory controller 14 for mapping requests made according to the bus protocol used by the interconnect 10 onto the specific protocols for addressing the particular kind of memory storage implemented in the corresponding storage unit 12 (e.g. the storage units 12 could include volatile or non-volatile storage, according to various kinds of memory storage technology). The interconnect 10 may include a system cache 34 which acts as a shared cache accessible to each processing element 6.

Hence, a number of processing elements 6 may each have access to shared memory 12 within the host system 4. However, in addition to the processing elements 6 themselves, another source of memory access requests to shared memory 12 can be from devices 20, 22 coupled to the host system via corresponding root ports 26. Each root port 26 acts as a gateway to the host system for a corresponding device or group of devices. Although FIG. 1 shows each device 20, 22 having a separate root port 26, it is also possible for a group of devices to share a single root port. The devices 20, 22 may for example include any one or more of: an I/O (input/output) device for controlling interaction between the host system and the user or the outside world (e.g. a network controller, display controller, user input device, etc.); a hardware accelerator for performing certain bespoke processing functions (e.g. neural network processing, cryptographic functions, etc.) in a more efficient manner than could be performed in software using a general purpose processor 6, and/or external memory storage provided to provide additional storage capacity beyond the capacity provided in the memory storage 12 of the host system 4. The devices 20, 22 access shared memory 12 via a system memory management unit (SMMU, also known as Input/Output memory management unit or IOMMU) 30, which performs address translation and access permission checks for requests made by the devices 20, 22 in a similar manner to a memory management unit within a processing element 6 (such translation and permissions checks being based on address mappings and access permissions defined in page table structures stored in the memory system 12 and configured by software executing on the processing elements 6).

The interconnect 10 may be associated with home node circuitry 32 which is responsible for maintaining coherency between cached data held at private caches 8, 24 of a number of caching agents of the data processing system 2. The caching agents can include the processing elements 6 as well as any coherent devices 22 which have their own coherent private cache 24 (other devices 20 may be non-caching devices (or "I/O coherent" devices) which do not have a private cache that needs to remain coherent with the host device). For example, a coherent device 22 could be a device for which the interface between the device 22 and host system 4 is compatible with the CXL® (Compute Express Link®) standard.

The home node circuitry 32 implements a given coherency protocol, which defines a set of request types and response protocols associated with those request types. Each address may, with respect to a particular caching agent, be considered to be held in that caching agent's private cache in a particular coherency state. For example, the coherency state may specify, with respect to a given address and a given caching agent 6, 22, whether valid data for that address is held at the given caching agent's private cache 24, and if valid data is held, whether that data is clean or dirty, and/or is held in a unique or shared state (unique data being held exclusively in that caching agent's cache, and not in other caching agent's caches, and shared data being capable of also being held in other caching agent's caches). The coherency protocol may require that certain request types or responses to such requests may be associated with certain transitions of coherency state for cached items of data associated with the target address of the request. When a read/write request is received from one of the caching agents 6, 22 or an I/O coherent device 20 requesting a read/write operation to a given physical address, the home node circuitry 32 issues snoop requests to one or more other caching agents that could potentially hold valid cached data for that physical address. A snoop request may query the current coherency state of the cached data for a specified address at a corresponding caching agent, and/or trigger changes in coherency state at the caching agent (e.g. invalidating cached data if the requester of the original read/write request requires the data to be cached in the unique state in its cache, and/or causing return of dirty data held in a snooped caching agent's cache 8 so that the dirty data can be made accessible to the requester which sent the read/write request).

As shown in FIG. 1, the home node circuitry 32 may be associated with a snoop filter 36 for tracking (at least partially) which data addresses are cached at certain caching agents 6, 22. The snoop filter 36 can be used to reduce snoop traffic by allowing the coherent interconnect 10 to determine when data is not cached at a particular requester. In the absence of snoop filtering, when one requester 6, 20, 22 issues a read or write transaction to data which could be shared with other caching agents 6, 22, the coherent interconnect 10 may trigger snoop requests to be issued to each other caching agent which could have a cached copy of the data from the same address. However, if there are a lot of caching agents, then this approach of broadcasting snoops to all cached requesters can be complex and result in a large volume of coherency traffic being exchanged within the system 2. By providing a snoop filter 36 which can at least partially track which addresses are cached at the respective caching agents 6, 22, this can help to reduce the volume of snoop traffic, enabling more efficient use of available request bandwidth and improving system performance. With the number of caching agents present in a modern system, it can be infeasible to implement a precise snoop filter scheme exactly tracking the addresses stored at each caching agent 6, 22, as such precision may be unacceptably expensive in terms of the storage and bandwidth cost. Therefore, the snoop filter 36 may track the content of the caches imprecisely. Provided there are no false snoop suppression instances where data actually held at a given private cache 8, 24 is mistakenly identified as not present so that snoops to that given private cache 8, 24 are incorrectly suppressed, it can be permitted to use a less precise tracking scheme which permits cases where the snoop request is issued to a given caching agent but (due to lack of precise information) that caching agent actually does not hold a valid copy of the data for the address specified in the snoop request.

In some examples the system cache 34 and snoop filter 36 may be combined, with a single structure looked up based on an address providing both cached data and snoop filter information associated with that address.

As mentioned further below, in some instances, further snoop filtering circuitry 40 can be provided at the root port 26 associated with at least one coherent device 24, to provide for further filtering of snoop requests targeting that device.

As shown in FIG. 1, the host system 4 may also include memory encryption/decryption circuitry 50 for encrypting/decrypting data written to the memory storage 12 or read from the memory storage 12. Providing an on-board encryption engine can be useful for improving security in confidential computing scenarios. The encryption/decryption applied by the memory encryption/decryption circuitry 50 may depend on key information 52 accessible to the memory encryption/decryption circuitry 50. The key information 52 to use for encrypting/decrypting data for a given memory request may be selected based on a memory encryption context identifier (MECID) associated with the memory request. The MECID distinguishes between two or more different memory encryption context associated with the same physical address space, so that respective portions of mutually distrusting software having access to portions of the same physical address space can have their data be subject to different encryption regimes (e.g. different encryption keys) to help preserve each other's confidentiality.

Figure 2:
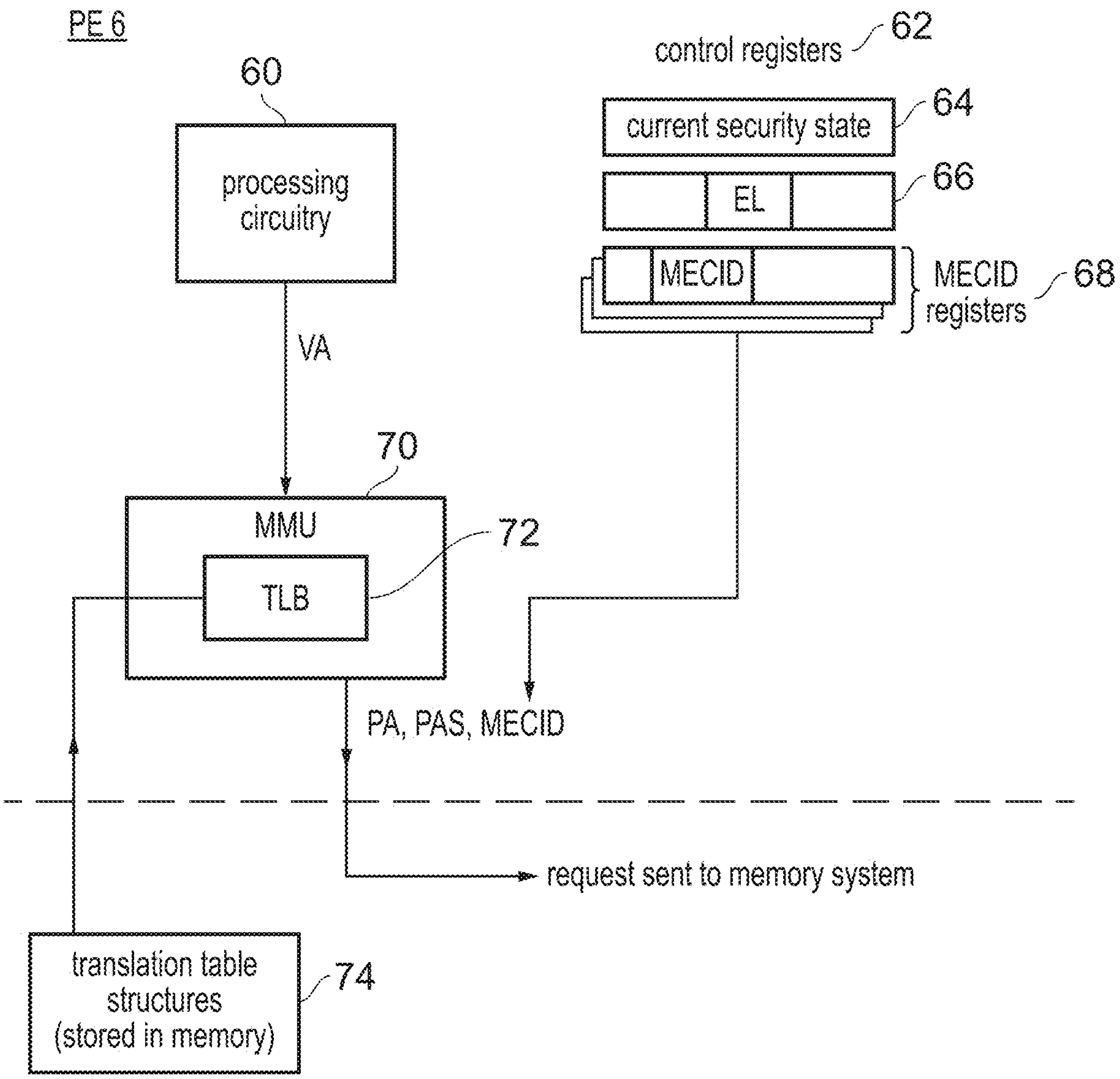
FIG. 2 illustrates an example of processing circuitry capable of tagging memory access requests with a memory encryption context identifier (MECID)

FIG. 2 illustrates an example of a processing element 6 capable of assigning MECIDs to memory access requests. The processing element 6 includes processing circuitry 60 for executing program instructions to carry out processing operations, a set of control registers 62 for storing control state information, and a memory management unit 70 (comprising a translation lookaside buffer (TLB) 72) for controlling access to memory by the processing element 6 based on address translation mappings and access permissions information defined in translation table structures 74 stored in the memory 12. The TLB 72 caches translation table information derived from the translation table structures 74. The control registers 62 in this example include an indication of a current security state 64 and a current exception level 66, and a set of MECID registers 68 used for assignment of MECIDs to requests issued in a current operating state.

Figure 3:
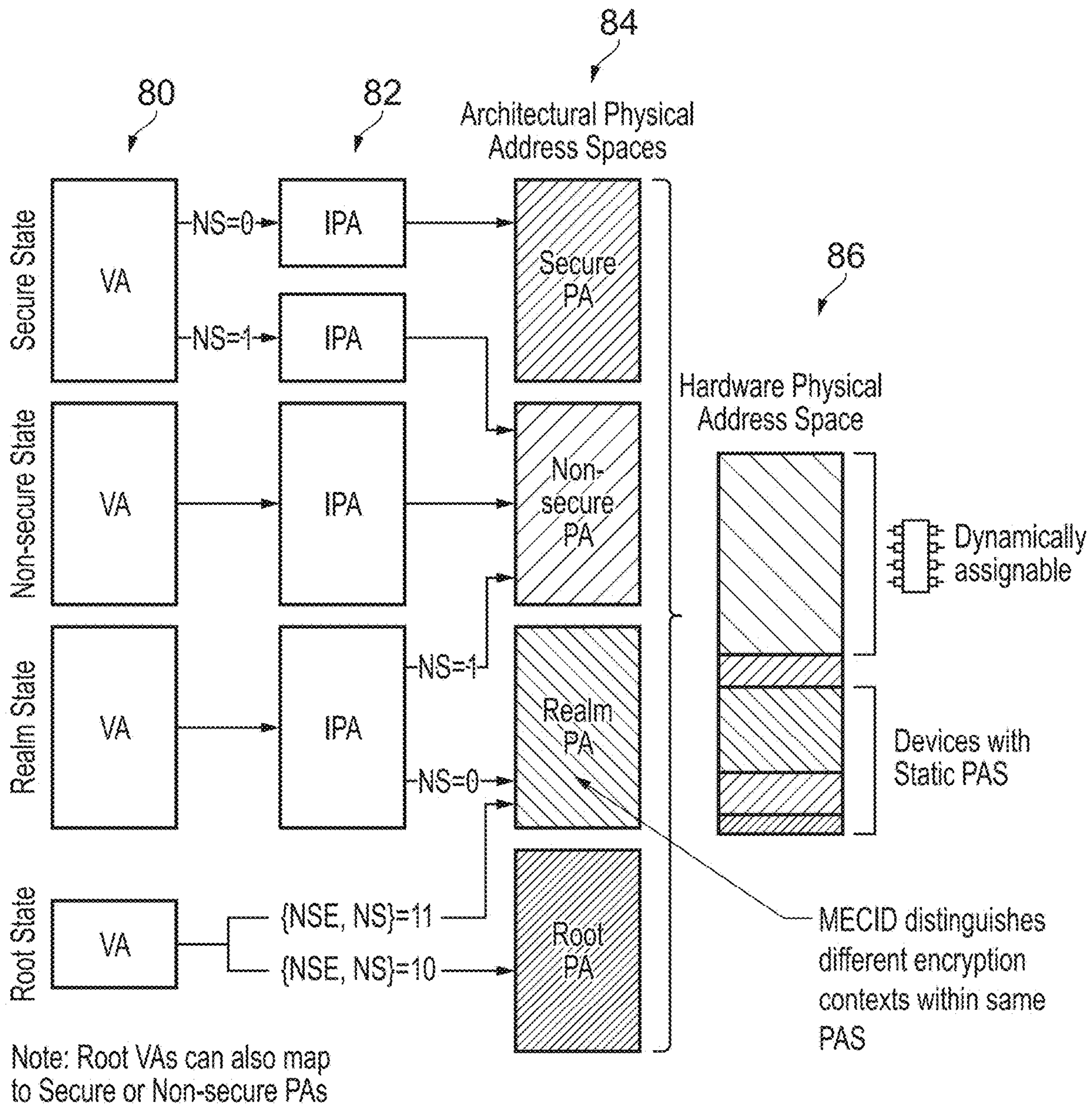
FIG. 3 illustrates use of multiple physical address spaces.

As shown in FIG. 3, in this example a processing element 6 supports multiple distinct architectural physical address spaces 84 which can be used to address the memory system. Data processing systems may support use of virtual memory, where address translation circuitry is provided to translate a virtual address specified by a memory access request from a virtual address space 80 into a physical address associated with a location in a memory system to be accessed. The mappings between virtual addresses and physical addresses may be defined in one or more page table structures 74. The page table entries within the page table structures could also define some access permission information which may control whether a given software process executing on the processing circuitry is allowed to access a particular virtual address. For some translation regimes, the translation may involve two stages of address translation. If a two-stage translation is used then mapping from a virtual address space 80 to a physical address space 84 is via an intermediate address space 82 based on two separate sets of translation table structures, one for stage 1 (virtual-to-intermediate address translation) and one for stage 2 (intermediate-to-physical address translation).

In some processing systems, all virtual addresses may be mapped by the address translation circuitry onto a single physical address space which is used by the memory system to identify locations in memory to be accessed. In such a system, control over whether a particular software process can access a particular address is provided solely based on the page table structures used to provide the virtual-to-physical address translation mappings. However, such page table structures may typically be defined by an operating system and/or a hypervisor. If the operating system or the hypervisor is compromised then this may cause a security leak where sensitive information may become accessible to an attacker.

Therefore, for some systems where there is a need for certain processes to execute securely in isolation from other processes, the system may support operation in a number of domains and a number of distinct architectural physical address spaces 84 may be supported, where for at least some components of the memory system, memory access requests whose virtual addresses are translated into physical addresses in different architectural physical address spaces 84 are treated as if they were accessing completely separate addresses in memory, even if the physical addresses in the respective physical address spaces actually correspond to the same location in memory. By isolating accesses from different domains of operation of the processing circuitry into respective distinct physical address spaces as viewed for some memory system components, this can provide a stronger security guarantee which does not rely on the page table permission information set by an operating system or hypervisor.

In this example, the processing circuitry 16 can execute instructions in one of four security states: a non-secure security state, a secure security state, a realm security state and a root security state. The current security state indication 64 in the control registers 16 designates which security state is currently being used. Each of the four security states is associated with a corresponding architectural physical address space (PAS) 84. Hence, there are four architectural PASs: a non-secure PAS, secure PAS, realm PAS and root PAS.

The root state is the most privileged state, and is used for executing software which controls transitions to/from the other security states. The root state is able to have its virtual addresses translated from the virtual address space 80 to any of the four architectural physical address spaces. Information (NSE, NS) specified in the page table structures 74 used to control the virtual address (VA) to physical address (PA) mapping is used to control which architectural PAS is selected for a given memory access request issued in the root security state.

The non-secure state is the least privileged security state, and its memory accesses are translated by default into physical addresses in the non-secure PAS (potentially via two stages of address translation from virtual address space 80 to intermediate address space 82 and from intermediate address space to the non-secure physical address space 84).

The secure state and realm state are orthogonal security states which are not able to access each other's physical address spaces or the root physical address space, but which are able to select whether they access their own respective PAS (realm PAS for the realm state and secure PAS for the secure state) or whether they should access the non-secure PAS. Hence, information (NS) specified in the page table structures 74 used to control address translation can be used to select whether a given memory access request has its address translated into the non-secure or secure PAS (when the request is issued from the secure security state) or into the non-secure or real PAS (when the request is issued from the realm security state).

Figure 4:
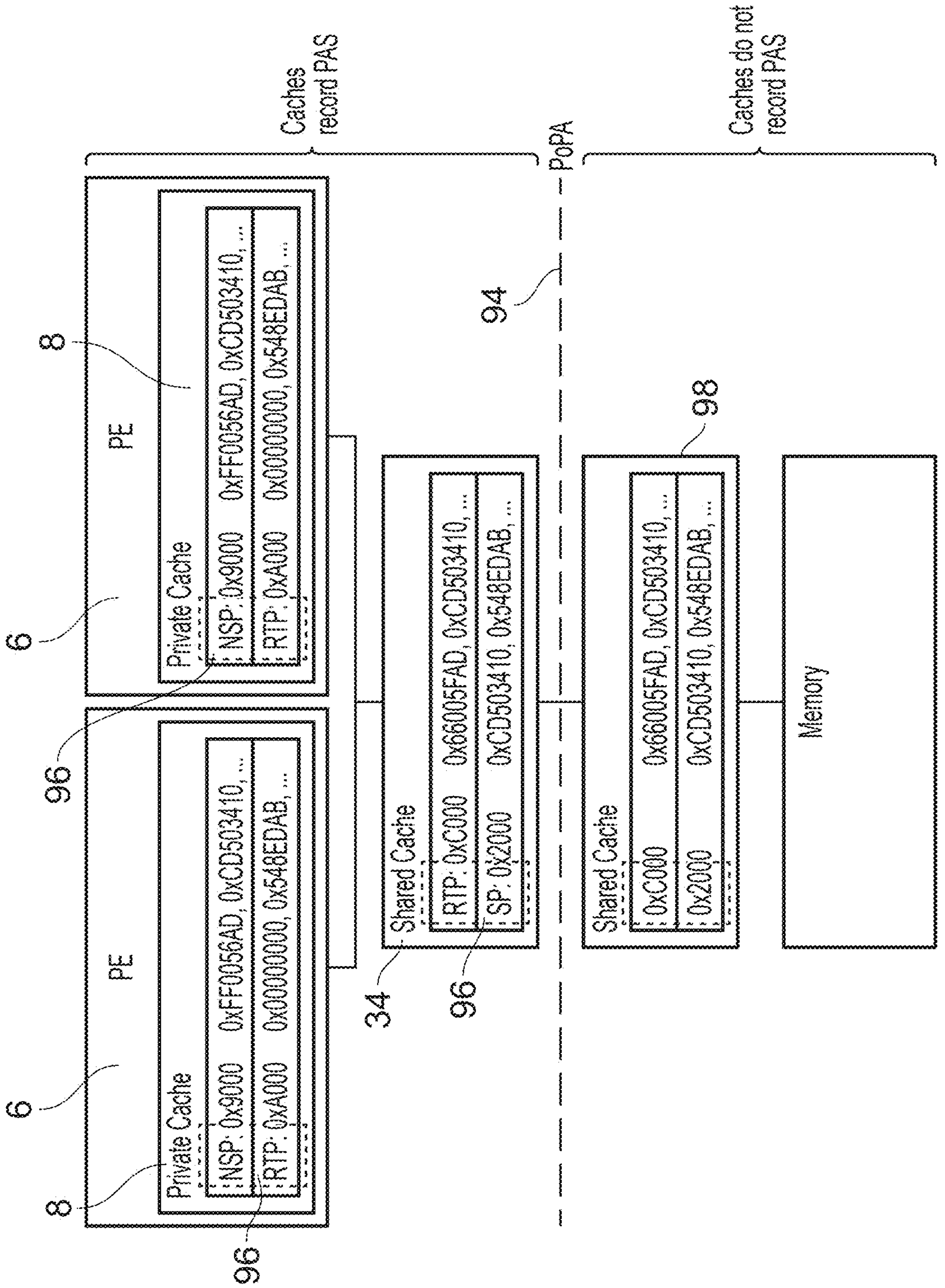
FIG. 4 illustrates a point of physical aliasing.

As shown in FIG. 4, the memory system may include a point of physical aliasing (PoPA) 94, which is a point within the memory system at which aliasing physical addresses from different architectural physical address spaces 84 which correspond to the same memory system resource are mapped to a single physical address uniquely identifying that memory system resource in a hardware physical address space 86 used by downstream memory system components (e.g. memory controllers 14 and memory storage 12). Although more complicated mappings between aliasing addresses are possible (e.g. based on a mapping table tracking which values in the PASs 84 map to the same hardware physical address), it can be simplest if the addresses of the respective architectural PASs 84 which are considered to alias to the same location in the hardware physical address space 86 are those addresses which have the same physical address value (e.g. PA=X in the secure PAS and PA=X in the non-secure PAS are considered aliasing addresses). The location of the PoPA 94 could vary, e.g. it could be either upstream or downstream of the interconnect 10. In the example of FIG. 1, the PoPA 94 is downstream of the interconnect 10 (and upstream of the memory controllers 14) so that the system cache 34 is prior to the PoPA, but other examples could provide the PoPA 94 upstream of the interconnect 10. Also, while FIG. 4 shows an example with at least one cache 98 downstream of the PoPA 94, this is not essential and other examples may not have any further caches downstream of the PoPA 94 (e.g. FIG. 1 does not show any post-PoPA cache).

Pre-PoPA memory system components, such as caches 8, 34 in the example of FIGS. 1 and 4 (or other cache-like structures such as the translation lookaside buffer 72), may treat aliasing physical addresses of different PASs 84 as if they correspond to different memory system resources, even if they ultimately map to the same memory system location in the hardware physical address space 86 used by underlying memory 12 beyond the PoPA 94. For example, the pre-PoPA caches 8, 34, 72 may cache data, program code or address translation information for the aliasing physical addresses in separate entries, so that if the same memory system resource is requested to be accessed from different physical address spaces, then the accesses will cause separate cache or TLB entries to be allocated. Also, the pre-PoPA memory system component could include the home node circuitry 32 and snoop filter 36, which may separately track coherency states of data held at respective caching agents 6, 22 for the aliasing addresses in different architectural physical address spaces 84. Hence, the aliasing physical addresses are treated as separate addresses for the purpose of maintaining coherency even if they do actually correspond to the same underlying memory system resource. As shown in FIG. 4, one way to ensure that aliasing addresses from different architectural PASs 84 are treated as separate addresses can be to include a PAS identifier (PASID) 96, which distinguishes which architectural PAS 84 is associated with a given memory access request, as additional address bits in the representation of physical addresses used to look up these pre-PoPA memory system components.

Regardless of the form of the pre-PoPA memory system component, it can be useful for such a PoPA memory system component to treat the aliasing physical addresses of the respective architectural address spaces 84 as if they correspond to different memory system resources, as this provides hardware-enforced isolation between the accesses issued to different physical address spaces so that information associated with one domain cannot be leaked to another domain by features such as cache timing side channels or side channels involving changes of coherency triggered by the coherency control circuitry.

In contrast, once requests pass beyond the PoPA 94, the aliasing addresses from the respective architectural PASs 84 are mapped to a single unique physical address in the hardware PAS 86. For example, if the aliasing physical addresses in the architectural PASs 84 are simply those having the same physical address value, the mapping to the hardware PAS 86 can be carried out simply by stopping using the PASID as additional address bits when looking up storage structures. As shown in FIG. 4, for example, a post-PoPA cache 98 may, for its lookups, no longer use the PASID 96 as part of the address lookup information, unlike the pre-PoPA caches 98 which do use the PASID 96 for address lookups.

The hardware physical address space 86 may be partitioned to enable access to certain physical memory system locations only to certain architectural PASs. This could be based either on a static mapping (e.g. memory regions assigned to certain devices 20, 22 could be statically reserved only to be accessible to a certain architectural PAS) or based on a dynamic mapping defined in a control structure which can be looked up by the MMU 70 to determine whether, for a memory access request which has caused translation of the virtual address specified by the request into a particular target physical address in a target PAS 84, that target physical address is allowed to be accessed from within that target PAS 84.

The use of multiple architectural PASs 86 for addressing some pre-PoPA memory system components such as caches 8, 34 can be useful for improving security for some use cases, to enable software operating in the Realm or Secure state to be isolated (by a hardware-enforced mechanism) from untrusted software running in the Non-Secure state. However, nevertheless a given architectural PAS (e.g. the realm PAS) may support a number of pieces of software which are mutually distrusting and which may not trust the operating system or hypervisor setting the translation table structures 74 to set access permissions to prevent inappropriate access to its data by other software sharing the same architectural PAS 84. Therefore, as shown in FIG. 3, it can be useful, for at least some of the architectural PASs 84, to provide support for MECIDs (memory encryption context identifiers) which distinguish different encryption contexts within the same architectural PAS 84.

As shown in FIG. 2, the processing element 6 may comprise MECID registers 68 which can be used by software to configure which MECID values should be assigned to the memory requests issued by the processing circuitry 60 at a given time. For example, some approaches could simply provide a single MECID register 68 which indicates the MECID currently in use (which can be updated by privileged software on a context switch between one encryption context and another). It is also possible to provide multiple items of MECID-identifying state (e.g. in different fields within a single MECID register 68 or in different MECID registers 68), each item of MECID-identifying state being associated with a respective operating state (e.g. exception level or privilege level) of the processing element 6, so that, based on the current exception level indication 66 or another indication of the current operating state, the appropriate MECID for that operating state can be selected. By supporting MECIDs being defined simultaneously for multiple operating states (e.g. exception levels), this can reduce the amount of reprogramming of MECID registers needed when transitioning back and forth between different operating states (e.g. such frequent transitions can be common when handling exceptions). Also, it may be possible to define multiple items of MECID-defining state which may apply to different classes of memory access operations. For example, which item of MECID-defining state is used to provide the MECID to be used for a given memory access request may depend on the type of load/store instruction executed to cause that memory access request to be issued. Hence, it will be appreciated that there are a wide variety of architectural mechanisms by which software-configured state in control registers 62 can be specified to influence assignment of MECIDs to particular memory access requests.

Hence, as shown in FIG. 2, when a given memory access request is issued by the processing element 6 to the memory system 8, 10, 12, the request may specify, in addition to the physical address translated from a virtual address by the MMU 70 and the PAS ID identifying a target architectural PAS 84, a MECID which distinguishes a selected memory encryption context associated with the request from other memory encryption contexts of the target architectural PAS.

While FIG. 2 shows an example of registers 68 defined at the processing element 6 to control assignment of MECIDs to memory access requests, requests sent to the memory system by devices 20, 22 may similarly be tagged with MECIDs. Software executing on the processing elements 6 may configure state information associated with a given device 20, 22 which specifies which MECIDs to assign to device-originating memory system requests from that device.

Figure 5:
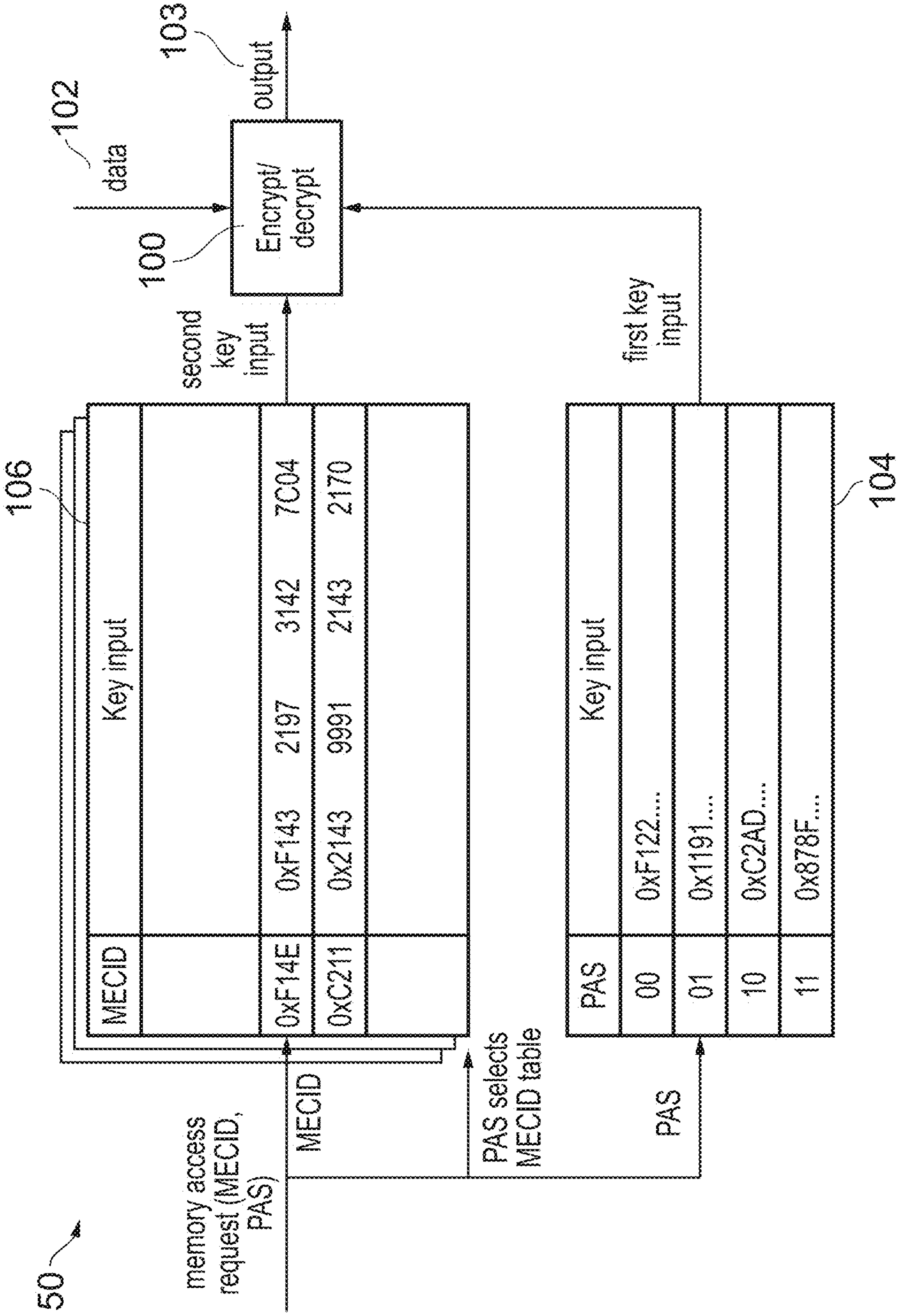
FIG. 5 illustrates use of the MECID to control selection of key information for encryption/decryption of data stored in a memory system.

FIG. 5 illustrates an example of a portion of the memory encryption/decryption circuitry 50 (referred to as "encryption engine" for conciseness below). The encryption engine 50 includes encryption/decryption circuitry 100 which applies a given cryptographic algorithm to input data 102 to generate output data 103, depending on a first key input 104 and a second key input 106. For example, on a write operation to write data to memory 12, the write data 102 can be encrypted based on the first and second key inputs 104, 106 to generate encrypted write data 103 to be stored to memory 12. On a read operation to read data from memory 12, the read data 102 read from memory 12 can be decrypted based on the first and second key inputs 104, 106 to generate decrypted read data 103 to be returned to a requester 6, 20, 22. In this example, the first key input 104 may be an encryption key selected based on the PASID of the memory access request identifying which architectural PAS 84 is associated with the request. Hence, each architectural PAS 84 may be associated with a different encryption key. The second key input 106 may be a tweak or modifier used to adapt the first key input 104 (the second key input having fewer bits than the first key input), and can be selected based on the combination of the PAS ID and MECID. Hence, requests in the same architectural PAS 84 associated with different MECIDs result in different combinations of the first/second key inputs 104, 106 and so the same input data would be encrypted/decrypted differently for different encryption contexts, to preserve confidentiality between mutually distrusting software accessing the same architectural PAS 84. The key information stored in the first/second key input tables 104, 106 may be programmed by privileged software (e.g. access to the key information tables may be restricted to the root software operating in the root security state).

FIG. 5 shows an example where the MECID is used to select between alternative pieces of key information used for encryption/decryption of data stored in a memory system. However, other aspects of the encryption/decryption, not just selection of the encryption/decryption key, could also be controlled based on the MECID. For example, in some implementations the particular cryptographic algorithm to be applied (or certain parameters of that algorithm) may be selected based on the MECID.

While FIG. 5 shows an example in which MECIDs are supported for multiple architectural PASs, in other examples MECIDs may be supported only for one of the PASs 84, in which case the second key input could be looked up based on MECID alone, independent of PAS 84 (the PAS ID may still influence whether the tweak associated with the second key input is applied to the primary key input 104 at all). For instance, MECIDs could be supported for the Realm PAS 84 but not for the Non-Secure PAS, Secure PAS or Root PAS, in which case the first key input 104 could be used unmodified for accesses associated with the Non-Secure, Secure or Root PAS but could be tweaked based on the second key input 106 selected based on MECID for accesses associated with the Realm PAS.

Also, while memory encryption contexts identified by MECID are described here in relation to the scheme with multiple architectural physical address spaces 84 as shown in FIG. 3, it would also be possible to define MECIDs distinguishing different memory encryption contexts in a system which only has one architectural PAS, so does not support the multiple PASs shown in FIG. 3. In that case, the first key input could be a single key value (which may be configurable by software, but which once configured is shared between all requests), which is modified by the tweak provided by the second key input 106 looked up based on a MECID. Alternatively, rather than the MECID-based key information being a tweak 106 to another key 104 (with the tweak 106 having fewer bits than the key 104 to reduce the amount of MECID-specific information to be stored), the MECID could be used to select between a number of alternative full encryption keys (e.g. the MECID based selection could be applied to the first key input 104 providing a full encryption key, and there may not be any modifier 106 selected based on MECID).

Hence, in general the MECID may be an identifier assigned to memory access requests to distinguish between respective memory encryption contexts associated with a given physical address space. A memory encryption/decryption engine 50 may use the MECID to select between different configurations of encryption/decryption operation and/or different key information.

The inventors have recognised that such MECIDs can provide an opportunity for efficiency savings in the snoop filters 36, 40 used for filtering snoop traffic in a data processing system 2. When the underlying data in memory is encrypted according to different encryption regimes selected based on MECID, it is unlikely that a physical address associated with one MECID would be accessed by a memory access request associated with a different MECID. The MECID can therefore be regarded as a proxy for distinguishing the particular software workload (or group of workloads) which will make use of a certain block of physical addresses, and requests issued by other workloads are very unlikely to require access to that block of physical addresses. With a snoop filter structure which tracks, at granularity of MECIDs, which MECIDs are or are not in use for cached data held in the private cache 8 of a particular caching agent 6, 22, this can support filtering of snoops to a much greater extent (for a given amount of circuit area incurred in storing snoop filter information) than would be possible with a structure specifying entries per physical address, since a single MECID-based entry may be used to control filtering of snoops for an associated block of physical addresses accessed using that MECID. Put another way, for a given amount of snoop filter performance (reduction in unnecessary snoop traffic sent to caching agents to snoop addresses which are not actually held by those caching agents), the storage overhead of a MECID-based snoop filter may be much lower than for an address-based snoop filter offering similar levels of performance. MECID-based snoop filtering does not need to replace address-based filtering entirely (although purely MECID-based snoop filters are possible). In some examples, both MECID-based snoop filtering information and address-based snoop filtering information may be used to identify which snoop requests can be suppressed from being sent to corresponding caching agents.

Figure 6:
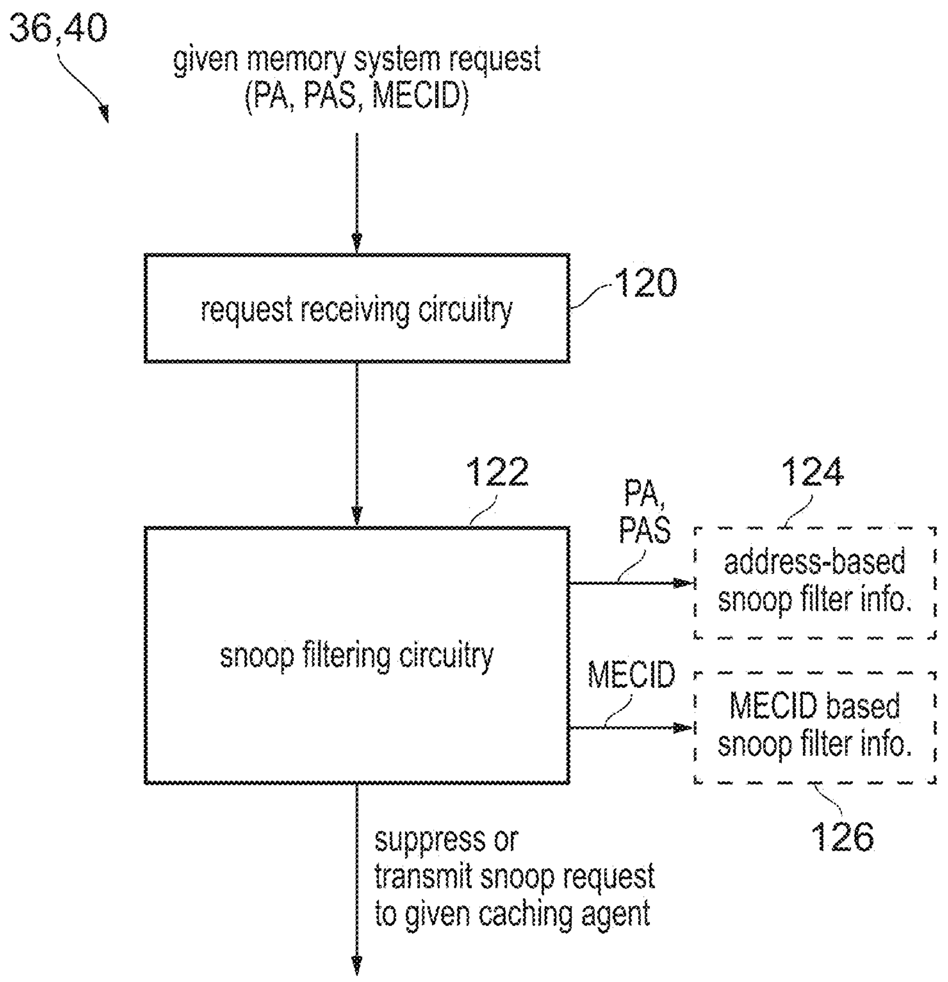
FIG. 6 illustrates an example of an apparatus comprising request receiving circuitry and snoop filtering circuitry.

FIG. 6 illustrates an example of a snoop filter 36, 40 comprising request receiving circuitry 120 and snoop filtering circuitry 122. The request receiving circuitry 120 receives a given memory system request specifying at least a target physical address and a target MECID (optionally the request could also specify a PAS identifier to distinguish between multiple architectural PASs as described above). The given memory system request could be a read/write request or a snoop request.

The snoop filtering circuitry 122 uses snoop filtering information 124, 126 to determine whether to transmit a snoop request to a given caching agent in response to the given memory system request, or suppress the snoop request from being sent to the given caching agent. The snoop filtering information may include address-based snoop filtering information 124 looked up based on at least the target physical address of the given memory system request. In systems supporting multiple architectural PASs 84, where the snoop filtering information is located prior to the PoPA 94, the address-based snoop filter information may also be looked up based on the PAS identifier, which may be treated as additional address bits for example. The address-based snoop filter information 124 can be maintained according to any known snoop filter approach, and may track, for at least a subset of physical addresses, which caching agents hold valid cached data for those addresses.

The snoop filtering information also includes MECID-based snoop filtering information 126 which specifies information for distinguishing whether, for a given caching agent, a given MECID should be regarded as a snoop-not-required MECID for which snoop requests are not required to be transmitted to that given caching agent in response to a given memory system request specifying that given MECID. A number of examples of the MECID-based snoop filtering information 126 are described below.

In some examples (e.g. where the snoop filter 40 is provided at a device port 26 that acts as a gateway to a coherent device 22), it is not essential to provide address-based snoop filter information 124 and so snoop filtering may be supported based on MECID but not based on physical address. Other examples (e.g. where the snoop filter 36 at the home node 32 supports MECID-based snoop filtering) may support snoop filtering based on both MECID and physical address. In this case, while FIG. 6 shows the MECID-based snoop filtering information 126 as separate from the address-based snoop filtering information 124, other examples could provide a combined structure which stores both types of snoop filtering information.

Figure 7:
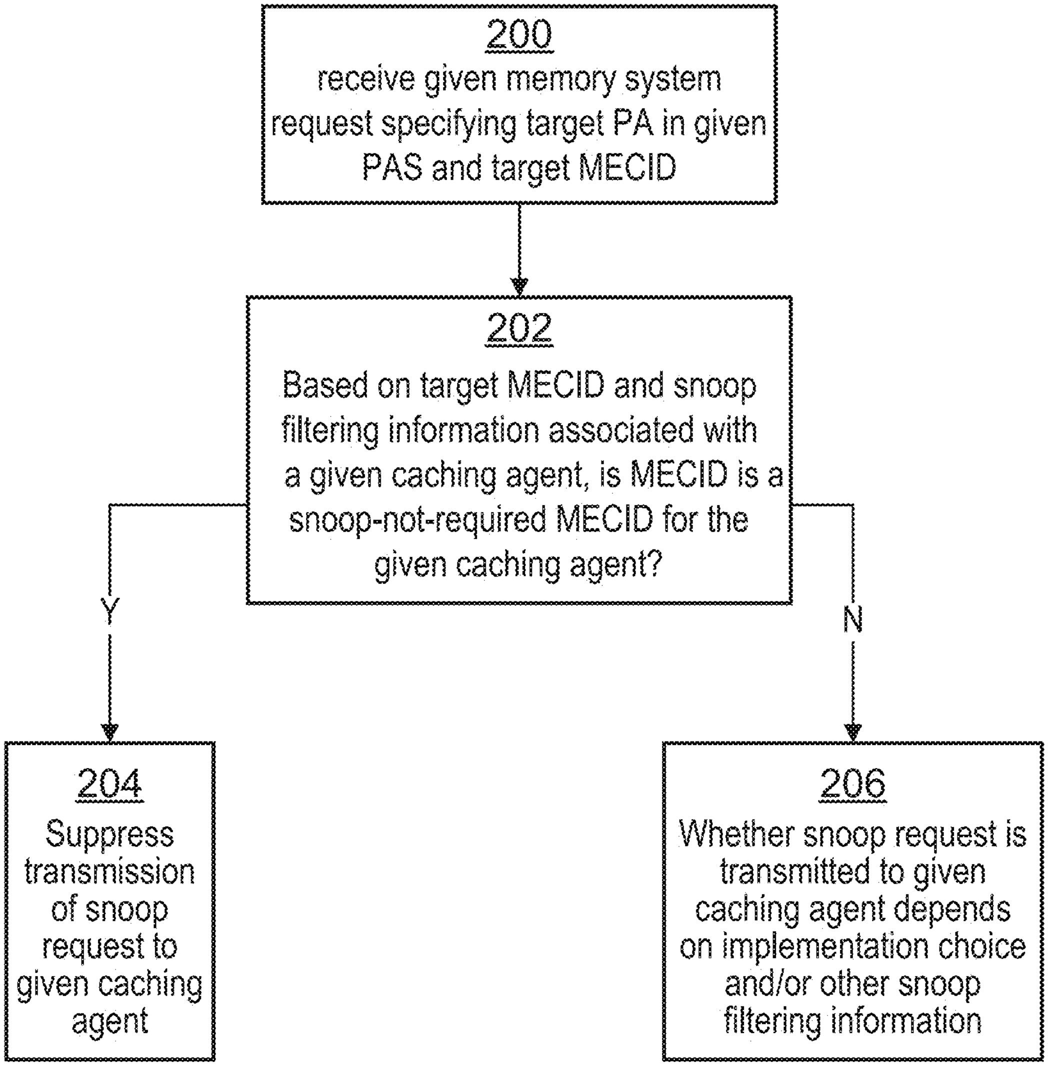
FIG. 7 illustrates a method of performing snoop filtering based on the MECID.

FIG. 7 is a flow diagram illustrating a method of performing snoop filtering. At step 200, the request receiving circuitry 120 receives a given memory system request specifying a target physical address in a given physical address space (PAS) and a target MECID specifying a selected memory encryption context (the target MECID distinguishing the selected memory encryption context from other memory encryption contexts associated with the given PAS). In some examples, the given PAS could be the only physical address space supported by the system. Alternatively, the given PAS could be one of a number of architectural PASs 84 supported and a PAS identifier specified by the memory system request could distinguish which architectural PAS 84 is associated with the request. Depending on the point at which the snoop filtering is applied, the given memory system request could be a read/write request issued by a requester 6, 20, 22, 30 to the home node circuitry 32 or could be a snoop request issued by the home node circuitry 32 to a given caching agent 6, 22.

At step 202, the snoop filtering circuitry 122 looks up the MECID-based snoop filtering information 126 based on the target MECID. Based on the target MECID and the MECID-based snoop filtering information 126 associated with a given caching agent, the snoop filtering circuitry 122 determines whether the target MECID is a snoop-not-required MECID for the given caching agent. If the target MECID is a snoop-not-required MECID for the given caching agent then at step 204 the snoop filtering circuitry 122 suppresses transmission of snoop request to the given caching agent. If the target MECID is not a snoop-not-required MECID, then at step 206, whether the snoop request is transmitted to the given caching agent can depend on implementation choice and/or on other snoop filtering information (e.g. the address-based snoop filtering information 124 if provided).

Figure 8:
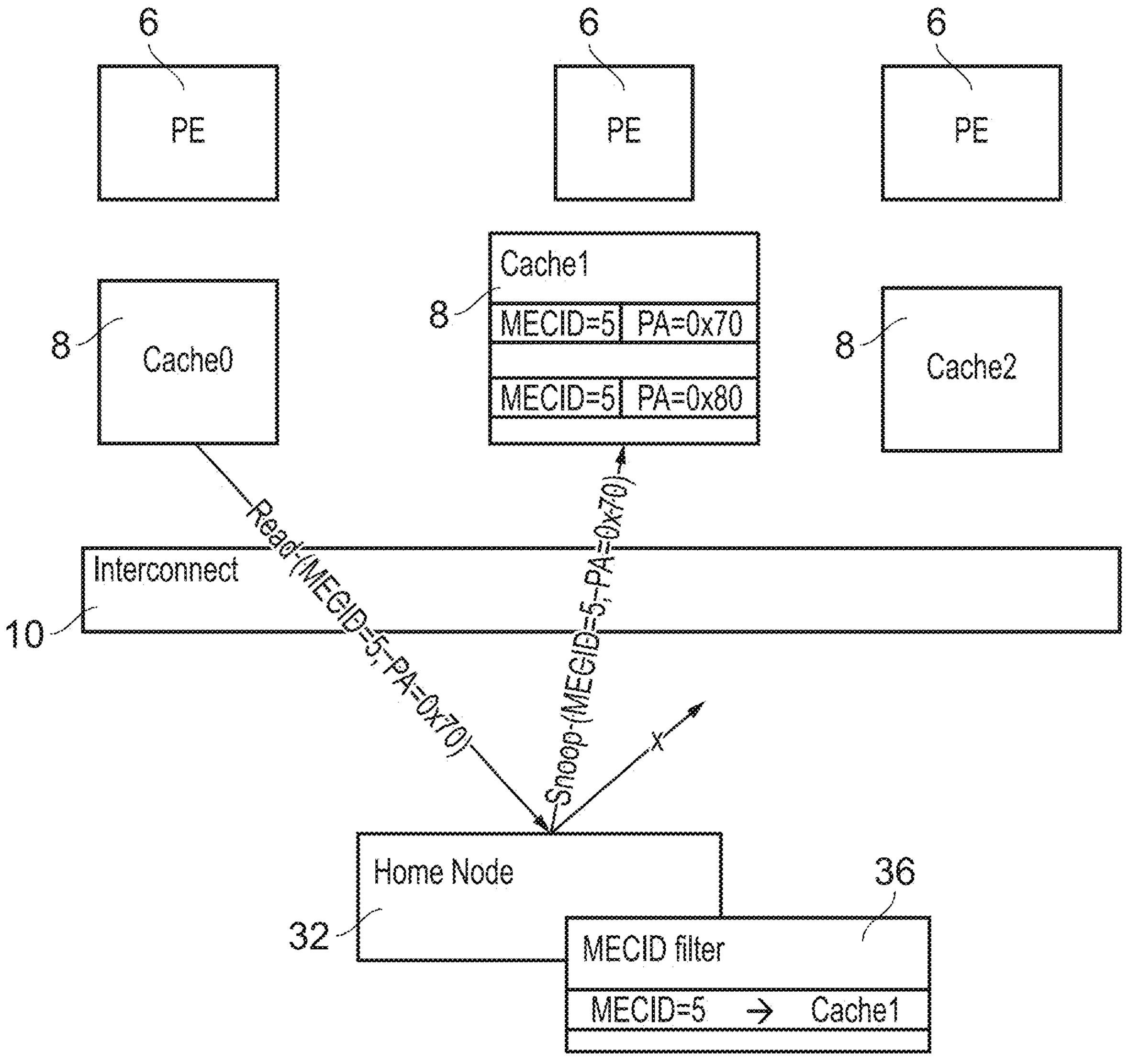
FIG. 8 illustrates an example of snoop filtering circuitry provided at a home node, which filters snoop requests based on the MECID.

FIG. 8 illustrates an example of implementing MECID-based snoop filtering at a snoop filter 36 associated with the home node circuitry 32. The snoop filter 36 maintains MECID-based snoop filtering information 126 which tracks, for a subset of MECIDs, which of the caching agents (e.g. processing elements 6 or coherent devices 22) hold valid data allocated in response to a request specifying that MECID.

Figure 9:
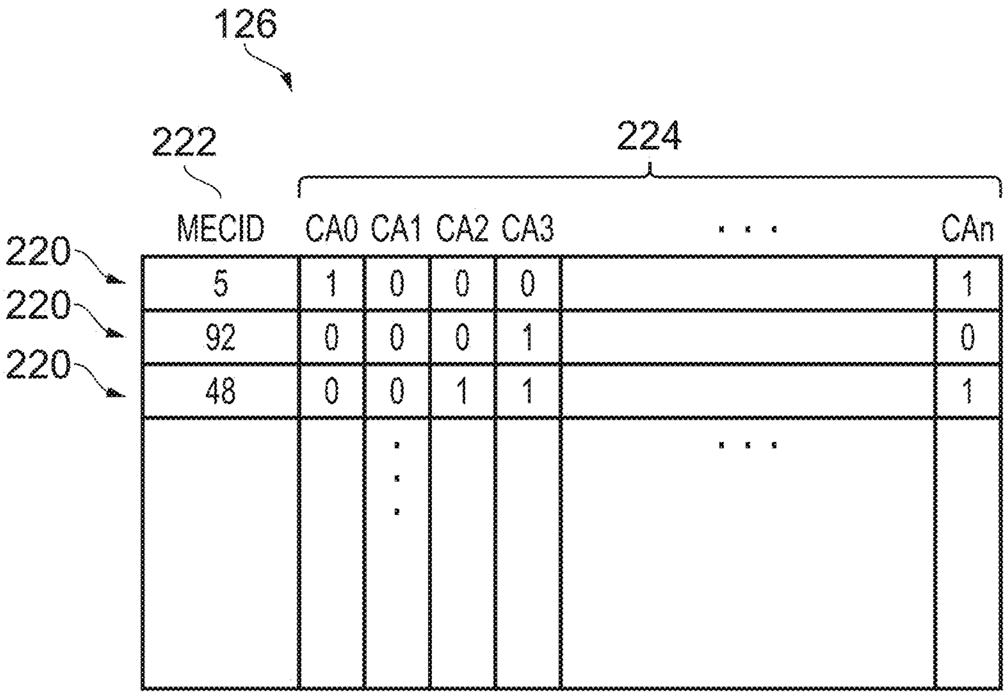
FIG. 9 illustrates an example of snoop filtering information for tracking whether a target MECID is a snoop-not-required MECID for a given caching agent.

FIG. 9 illustrates an example of the MECID-based snoop filtering information 126, which comprises a cache-like structure comprising a number of MECID tracking entries 220, each entry 220 specifying a corresponding MECID 222 and a set of caching agent indicators 224 each corresponding to a respective caching agent (or group of caching agents, if caching agents are grouped together for snoop filtering purposes, to reduce storage overheads). The caching agent indicator 224 for a given caching agent or group of agents indicates whether that caching agent or group of caching agents holds valid data for the corresponding MECID 222. Although not shown in FIG. 9 for conciseness, each entry 220 may also specify valid information indicating whether the information in the corresponding MECID tracking entry 220 is valid. For example, the indicators 224 may each comprise a single bit flag (or multi-bit indicator) for which a first value (e.g. 1) indicates that the corresponding caching agent or group of caching agents is believed to hold valid data for the corresponding MECID 222 and a second value (e.g. 0) indicates that the corresponding caching agent or group of caching agents does not hold valid data for the corresponding MECID 222. The indications 224 may be imprecise in the sense that the indications that a caching agent is believed to hold valid data for a given MECID may be out of date if that caching agent has since invalidated all the data for that MECID but the home node 32 has not necessarily been informed of all the invalidations. In fact, in some implementations, the home node 32 may not be able to track invalidation of data based on MECID at all, and so the caching agent indicators 224 may act as sticky flags so that any detection of allocation of valid data to a given caching agent for a given MECID may remain until the entire entry 220 for a given MECID is replaced upon needing to allocate a new tracking entry 220 for a different MECID.

Hence, with this example of tracking information, a given MECID (MECID=x) may be determined to be a snoop-not-required MECID for a given caching agent y if MECID x hits in the snoop filter information 126 (i.e. has a valid entry for which the MECID field 222 specifies MECID x) and the caching agent indicator 224 corresponding to caching agent y indicates that the caching agent y (or group of caching agents comprising caching agent y) does not hold valid data for MECID=x (e.g. in the example of FIG. 9, this may occur if the indicator 224 corresponding to MECID=x and caching agent y is set to 0). If either MECID=x misses in the MECID-based snoop filtering information 126 (there is no valid entry allocated for MECID=x) or MECID=x hits in the MECID-based snoop filtering information 126 but the caching agent indicator 224 corresponding to caching agent y indicates that caching agent y may potentially hold valid data for MECID=x (e.g. in the example of FIG. 9 this may occur when the indicator 224 corresponding to MECID=x and caching agent y is set to 1), then a snoop request is be sent to caching agent y.

Hence, in the example of FIG. 8, when a first caching agent associated with cache0 issues a read request specifying a given MECID=5 and physical address PA=0x70, and MECID=5 hits against an entry 220 of the MECID-based snoop filtering information 126 which specifies that data for MECID=5 is cached in cache1 associated with a second caching agent but not in cache2 associated with a third caching agent, the snoop filtering circuitry 36 associated with the home node can indicate to home node 32 that, while a snoop request should be sent to cache1 associated with the second caching agent as a response to the read request from the first caching agent 6, there is no need to send the snoop request to cache2 associated with the third caching agent.

This approach can save overhead compared to tracking each individual physical address associated with a given MECID in a snoop filter, since a single entry storing an association between a MECID and a given caching agent can suffice for making a snoop forwarding decision for any physical address associated with the MECID. While such MECID based filters may not be precise (there may be a limit to the number of MECIDs for which valid snoop forwarding information can be maintained, given the storage overheads of doing so), they can nevertheless reduce the amount of broadcasting needed for snoops and the circuit area overhead of achieving a given level of snoop broadcast reduction compared to pure-address-based snoop filtering approaches.

Figure 10:
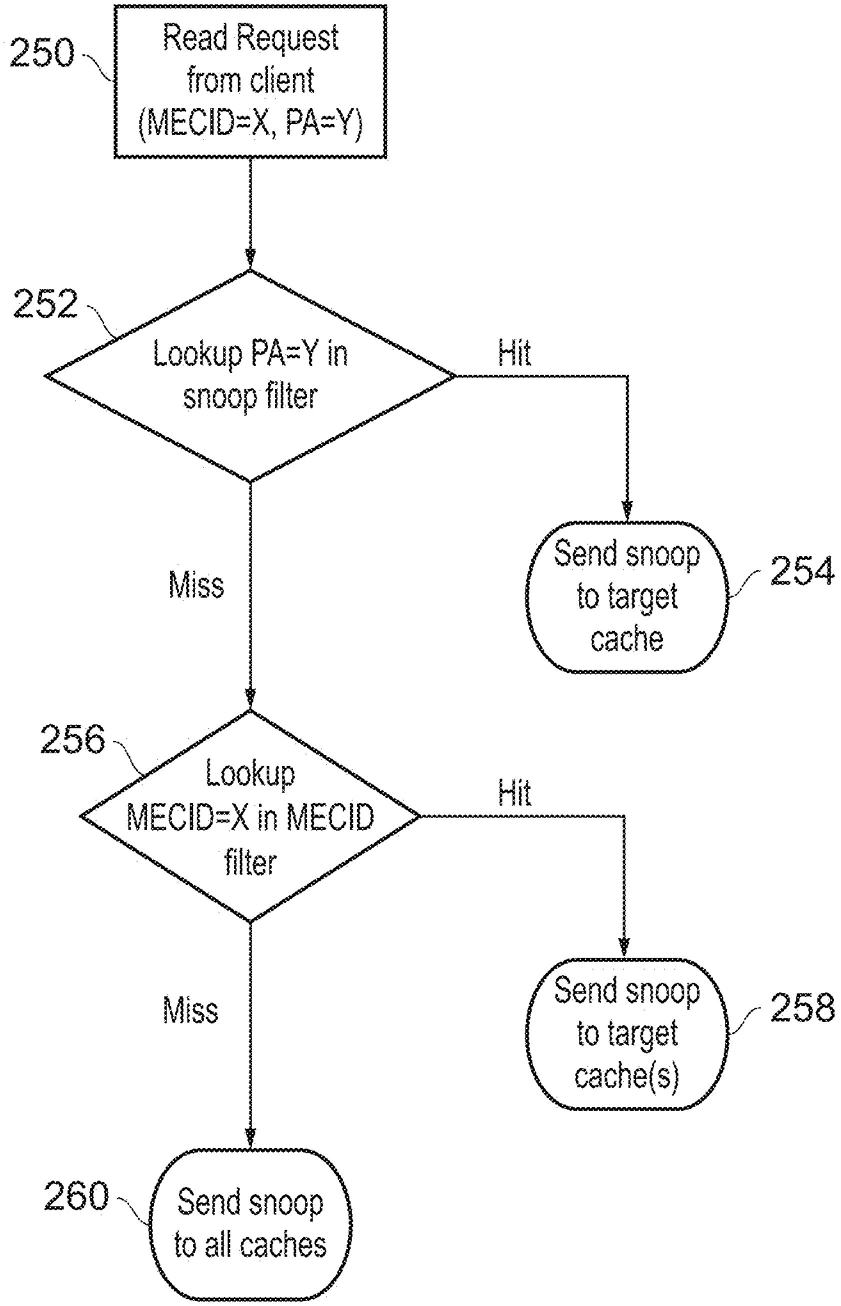
FIG. 10 illustrates steps performed in a snoop filter lookup.

FIG. 10 illustrates steps for controlling snoop filtering at a home node 32 based on MECIDs. At step 250 read request is received from a client caching agent specifying a target MECID=X and target physical address=Y. At step 252, the target physical address Y is looked up in the address-based snoop filtering information 124, and if the address-based snoop filter information contains a valid snoop filter entry corresponding to target physical address Y then the valid snoop filter entry is used to determine which caching agents are target caching agents which should be sent corresponding snoop requests. For example, a similar structure to the one shown in FIG. 9 may be used for the address-based snoop filtering information 124, but with the MECID field 222 replaced with a field for specifying information for identifying a physical address Y (or group of physical addresses—e.g. a tag value derived from a portion of the address may be stored). On a hit in the address-based snoop filtering information 124, those caching agents indicated as potentially holding cached data (e.g. based on indicators similar to the indicators 224 shown in FIG. 9) are transmitted snoop requests and other caching agents indicated as not holding valid cached data for PA=Y are suppressed from being sent snoop requests. Any known snoop filter technique may be used for the address-based snoop filter lookup.

If the lookup misses in the address-based snoop filter information 124, then at step 256 the snoop filtering circuitry 122 of the home node snoop filter 36 looks up the MECID-based snoop filtering information 126, and if there is a hit at step 258 identifies based on the valid MECID tracking entry 220 corresponding to MECID=X which caching agents are the target caching agents to which snoop requests should be sent. Snoops can be suppressed from being sent to those caching agents not indicated as holding valid data for MECID=x (e.g. the caching agents corresponding to indicators 224 set to 0 in the example of FIG. 9, although it will be appreciated that other encodings of the indicators 224 could also be used).

If the lookup for MECID=X misses in the MECID-based snoop filtering information 126 (there is no valid entry corresponding to MECID=X), then at step 260 snoop requests are broadcast to all caching agents, since there is no information available on whether any caching agents hold information for PA=Y or MECID=X.

Figure 11:
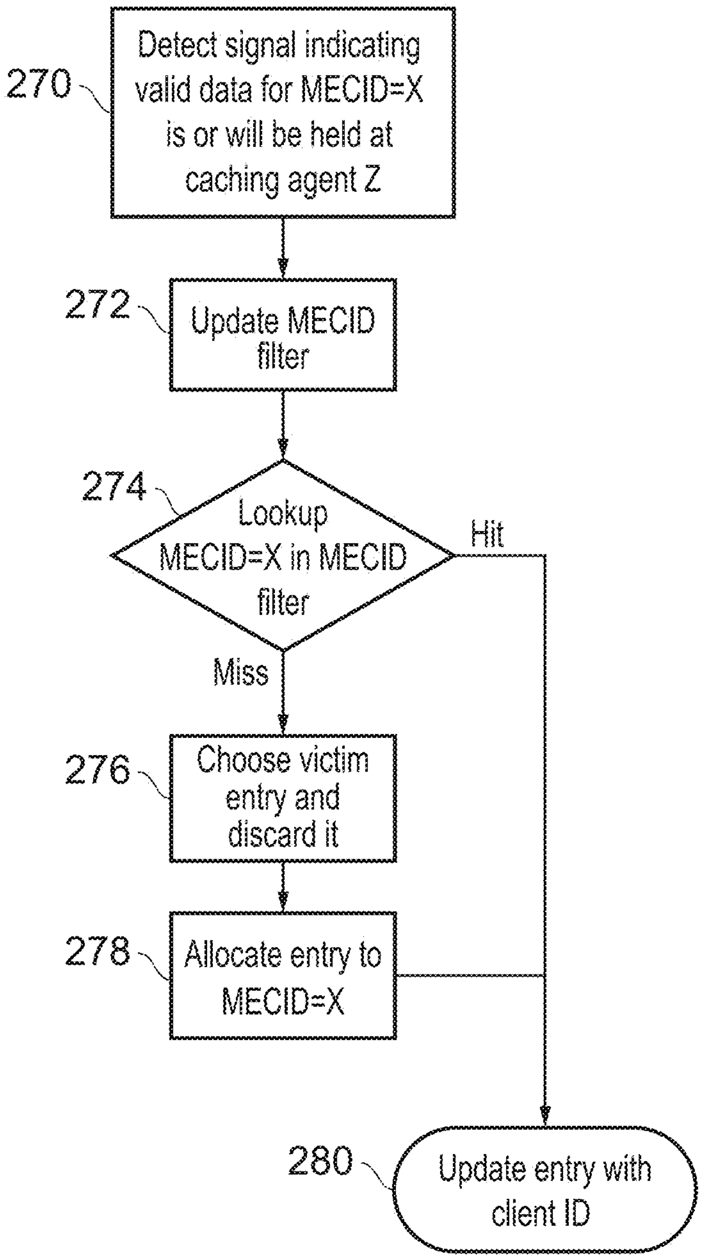
FIG. 11 illustrates steps performed to maintain the MECID-based snoop filtering information.

FIG. 11 illustrates steps for maintenance of the MECID-based snoop filtering information 126 in the example of FIGS. 8 and 9. At step 270, snoop filtering circuitry 122 of the home node snoop filter 36 detects a signal indicating that valid data for a given MECID (MECID=X) is, or will be, held at a given caching agent Z. For example, this signal could be a read request received from a requesting caching agent requesting that data for MECID=X is allocated to that caching agent's private cache, or a snoop response received from a responding caching agent that was sent a previous snoop request, indicating that the responding caching agent holds valid data for MECID=X. In response to detecting the signal indicating that valid data for MECID=X is or will be held at caching agent Z, the snoop filtering circuitry 122 determines at step 272 that the MECID-based snoop filtering information 126 should be updated.

At step 274, the snoop filtering circuitry 122 looks up the given MECID=X in the MECID-based snoop filtering information 126. If a miss is detected (there is not yet a valid MECID tracking entry 220 corresponding to MECID=X), then at step 276 victim entry is selected for reallocation to MECID=X. If an invalid MECID tracking entry 220 is available, the invalid entry can be selected as the victim entry in preference to valid entries. If there is no invalid entry 220 available, a replacement policy can be used to select which valid entry should be the victim entry (e.g. a round robin or least recently used policy may be used). The contents of the victim entry are discarded. There is no need to trigger any invalidations of information associated with the victim MECID from caching agents because the default approach taken at step 260 of FIG. 10 when a lookup for a target MECID misses in the snoop filter is to broadcast to all snoops, so simply discarding the victim MECID entry does not cause risk of valid cached data being missed due to snoop suppression. At step 278 the victim entry is reallocated for use for MECID=X.

Regardless of whether the MECID=X hit or missed in the MECID-based snoop filter information 126, at step 280 the entry corresponding to MECID=X is updated to specify that caching agent Z holds valid data for MECID=X. If the entry for MECID=X has only just been allocated at step 278, all indicators 224 other than the indicator corresponding to caching agent Z may be set to indicate that these caching agents do not hold valid data for MECID=X.

Figure 12:
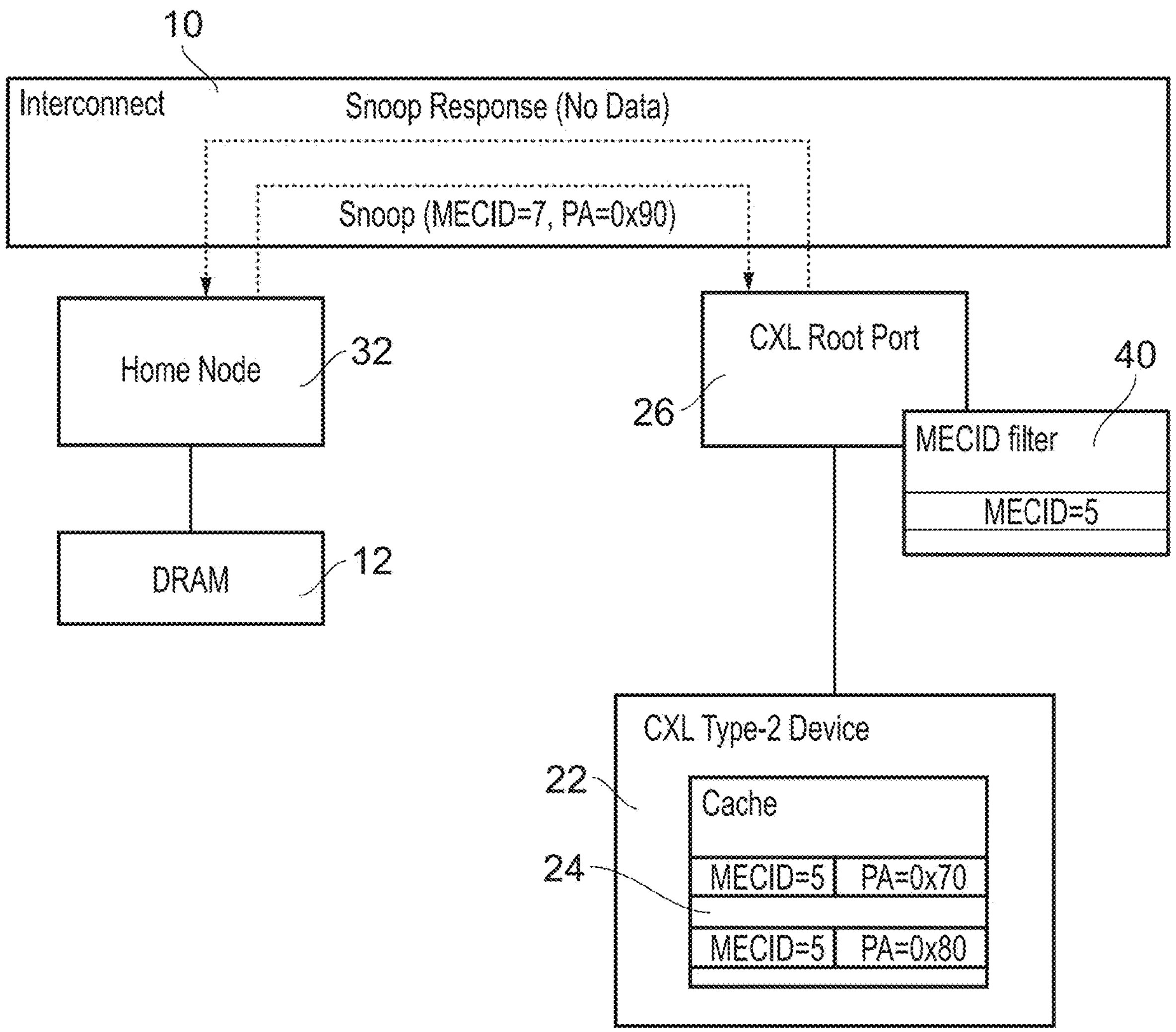
FIG. 12 illustrates another example of snoop filtering circuitry, provided at a port via which snoop requests are routed to a coherent device.

FIG. 12 illustrates another example of snoop filtering, this time at the root port 26 used to exchange requests and responses between the host system 4 and a coherent device 22 (e.g. a CXL® type-2 device, which support coherent caching of data from host memory where the coherency protocol is managed by the host). With the introduction of fully coherent devices 22, the coherency protocol of a host system 4 is extended to include new agents that are capable of observing, generating and responding to snoop requests. This creates a new attack surface as well as a new side-channel, as an attacker that operates a device 22 capable of receiving snoop requests or generating snoop responses can exploit this to track and affect information stored in host memory 12 that the attacker is not privileged to have access to. This is a problem because non-inclusive snoop filters at the home node 32 are occasionally forced to broadcast a snoop request to multiple agents. If one of these agents is not allowed to access the corresponding address specified in the snoop request, it is better for the coherent device 22 not to receive the snoop request, as the snoop request could allow the attacker to infer side-channel information about access patterns made by software executing on the host 4 and/or return bogus data in response to the snoop request which could corrupt data stored in host memory 12.

Being able to restrict the snoop traffic to a subset of a valid agents is difficult to achieve when there is no precise snoop filter entry, and providing a precise address-based snoop filter may require an unacceptably high circuit area cost in providing sufficient tracking entries to be able to track allocation of each physical address within the cache 24 of the device 22.

However, if snoop requests are tagged with the MECID of the original requester of data then this information can be leveraged by a "gateway" that is located at the boundary port 26 between the host system 4 and other coherent agents 22, so that the snoop filter 40 at the port 26 can make an efficient access control decision that satisfies the security requirements. Specifically, access control lists can be built at the gateway to enforce the security policies for snoop traffic without having to track cached data at physical address granularity at the gateway 26.

Hence, FIG. 12 shows an example of MECID based snoop filtering at the gateway port 26 associated with a coherent device 22. The gateway snoop filter 40 maintains MECID-based snoop filtering information which, unlike the imprecise snoop filter at the home node 32 shown in FIG. 9, maintains a precise record of the set of MECIDs that have valid data cached in the private cache 24 of the coherent device 22. If the limit in tracking capacity of the MECID based snoop filter 40 is reached and data for another MECID is to be allocated into the cache 24 of the coherent device 22, then a victim MECID may be selected and the root port's snoop filter 40 may issue a bus command to the device 22 requesting invalidation of all data cached in the cache 24 of the coherent device 22 for that MECID, so that precision in snoop filter tracking can be maintained even when the new MECID is allocated.

Hence, the given memory system request received at the request receiving circuitry 120 of the root port's snoop filter 40 may be a snoop request transmitted from the home node 32 to the root port 26 in response to a read/write request from another requester. For example, in FIG. 12 the snoop request specifies MECID=7 and physical address (PA)=0x90. The MECID-based snoop filter information at the root port is looked up and this determines that MECID=7 does not have any valid data cached in the coherent device's cache 24 (e.g. the only MECID for which the cache 24 holds valid data may be MECID=5 in this example). Therefore, the snoop request can be suppressed from being sent to the coherent device 22 to prevent information about address patterns accessed by MECID=7 being leaked to the coherent device which may be potentially untrustworthy. Also, as the snoop filtering circuitry 40 at the root port 26 can return a "no-data" snoop response (indicating that address PA=0x90 does not correspond to any valid data cached at device 22) immediately in response to checking the snoop filter 40, rather than needing to wait for a response from the device 22, there is also a performance benefit because the snoop response is available to the home node 32 sooner than if the snoop request had been sent to the device 22, and so average performance can be improved because the home node 32 may generally be able to proceed with the next step of processing the read/write request that triggered the snoop faster than if the device's response to the snoop had been awaited.

There can be a number of ways in which precise MECID-based snoop filter information can be maintained at the root port snoop filter 40. Unlike in the home node example 32, as the root port's snoop filter 40 is only tracking MECIDs in use for a specific device 22 or group of devices 22, rather than all caching agents, it becomes practical to maintain precise snoop filter information tracking each MECID which has valid cached data at the corresponding device 22 or group of devices.

Figure 13:
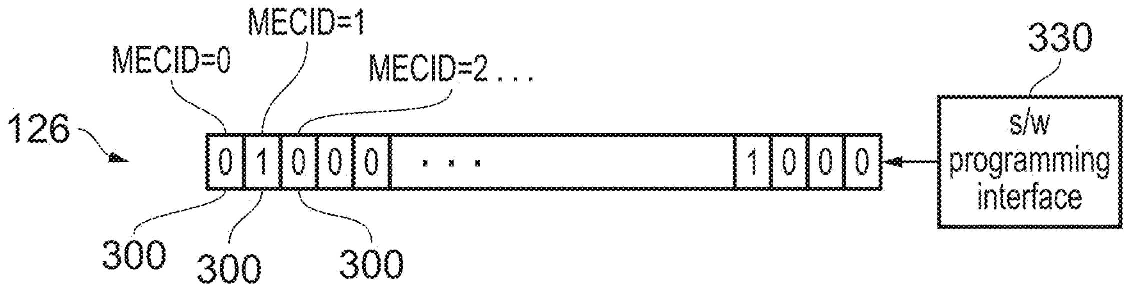
FIGS. 13 and 14 illustrate further examples of snoop filtering information for tracking which MECIDs are snoop-not-required MECIDs.

As shown in FIG. 13, in one example the MECID-based snoop filtering information 126 stored at the gateway snoop filter 40 may provide a list of MECIDs that the device is permitted to use, as programmed by privileged software via a software programming interface 330. For example, for a 12-bit MECID namespace, the MECID list 126 may comprise a bitmap of 4096 bits (1 per MECID value), each bit indicating whether the corresponding MECID is a snoop-required MECID (potentially having valid data held at the coherent device 22) or a snoop-not-required MECID (which definitely does not have valid data held at the coherent device 22). The programming interface 330 could be implemented by exposing either the storage for the snoop filtering information 126 itself or exposing some interface registers to which programming requests can be sent, as a set of memory-mapped registers mapped to particular memory addresses in the virtual address space 80 of the processing element 6, so that software can configure the snoop filter information 126 by issuing write requests to those addresses. For example, these programming requests may be issued by privileged software at the time of configuring a device 22 to operate on data for certain software contexts associated with known MECID values. Hence, software can set the snoop filtering information 126 to specify that an allowed set of MECIDs expected to have data allocated to the cache 24 of the coherent device 22 are allowed to have snoop requests sent to the coherent device 22. These allowed MECIDs may be indicated as not being snoop-not-required MECIDs, and any other MECID not selected as authorized by the controlling software can be considered a snoop-not-required MECID.

Figure 14:
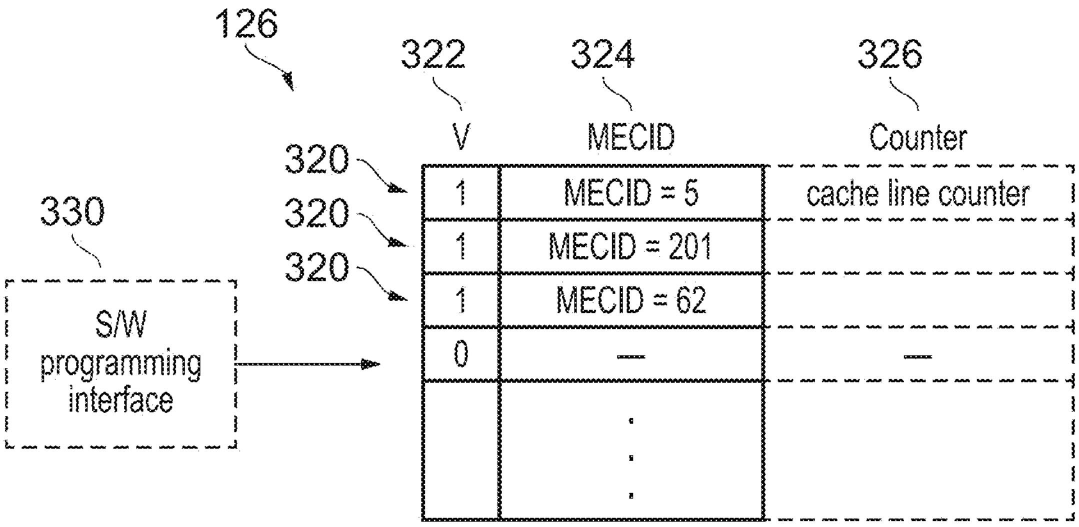

FIG. 14 shows another way of representing the list of authorized MECIDs allowed to have snoop requests sent to the device 22. In this example, rather than providing a bitmap or other set of tracking indicators per MECID, a cache-like structure with fewer entries 320 than the number of MECIDs may be provided, with each entry 320 specifying validity information 322 indicating whether that entry 320 is valid and specifying a corresponding MECID 324 indicated as being a MECID for which snoop requests are authorized to be transmitted to the device 22.

In some examples, the structure of FIG. 14 may be maintained by software using a programming interface 330 similar to the example of FIG. 13.

Alternatively, the snoop filter 40 at the gateway can autonomously manage a list of all MECIDs that might have data cached at the device. Such list can be managed by hardware tracking memory accesses made by the device and extracting the MECID that the access was tagged with. The gateway can track individual entries (or groups of entries) in the private cache 24 of the device 22 that are associated with a given MECID using a reference counter 326 which counts the number of cache lines allocated for that MECID in the "Unique" coherency state to the private cache 24 of the coherent device 22. The counter 326 can be adjusted in one direction (e.g. incremented) when an arbitrary cache line (for any physical address) associated with the MECID is allocated in the Unique state and adjusted in the other direction (e.g. decremented) when an arbitrary line associated with the MECID is Invalidated or made "Shared". This recognises that in a coherency protocol where any dirty data is by definition in the "Unique" state, there is no need to snoop cache lines that are in a "Shared" state. In other coherency protocols which permit a "Shared and Dirty" state, the counter 326 could instead track all valid lines associated with the corresponding MECID, not just cache lines in the Unique state. If a hardware-maintained cache line counter 326 is provided, then the valid information 322 may not need to be recorded separately from the cache line counter 326 as an entry 320 with the corresponding counter 326 indicating there are no cache lines associated with the corresponding MECID 324 in the private cache 24 of the device 22 can be considered to be invalid.

Figure 15:
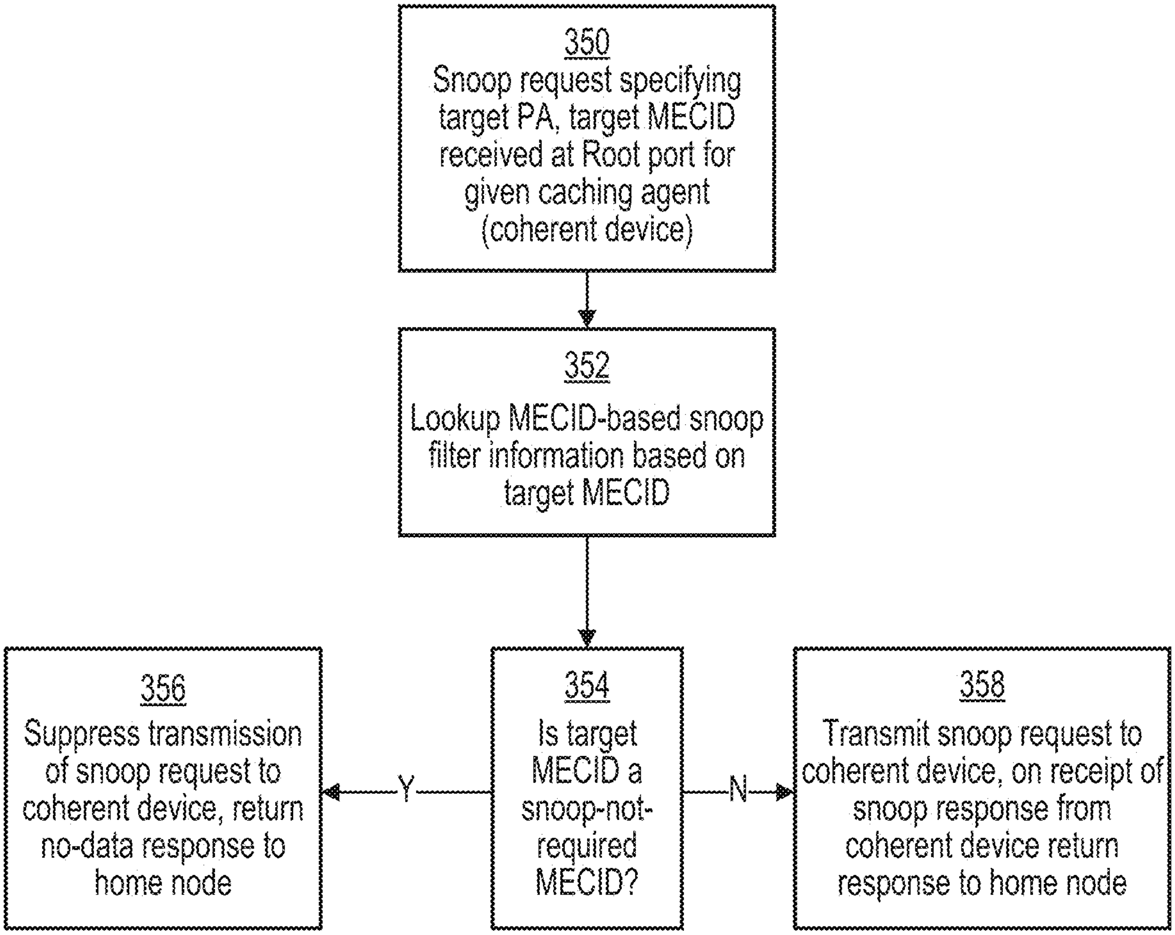
FIG. 15 illustrates steps performed to determine, based on the MECID-based snoop filtering information, whether a snoop request should be transmitted to a coherent device.

FIG. 15 illustrates steps for controlling snoop filtering using a snoop filter 40 provided at a root port 26 associated with a coherent device 22. At step 350, a snoop request specifying a target physical address and a target MECID is received at the request receiving circuitry 120 of the snoop filter 40 provided at the root port 26 associated with a given caching agent (coherent device 22). At step 352, the snoop filtering circuitry 122 of the root port's snoop filter 40 looks up its MECID-based snoop filter information 126 based on the target MECID specified in the state request. At step 354, the snoop filtering circuitry 122 determines whether the target MECID is a snoop-not-required MECID. For example, the target MECID may be determined to be a snoop-not-required MECID if the corresponding tracking indicator 300 in the example of FIG. 13 is set to a value indicating that the target MECID is not one of the MECIDs authorised for access by the coherent device 22 (e.g. if the value of the tracking indicator 300 is 0 in the example of FIG. 13). In another example, the target MECID may be determined to be a snoop-not-required MECID if a lookup of the MECID tracking structure in the example of FIG. 14 determines that the target MECID misses in the MECID tracking structure (does not correspond to any valid entry 320 or corresponds to an entry with the counter 326 indicating zero cache lines for that MECID). If the target MECID is a snoop-not-required MECID, then at step 356 transmission of the snoop request to the coherent device 22 is suppressed, and a no-data response is returned to the home node 32. If the target MECID is not a snoop-not-required MECID, then at step 358 the snoop request is transmitted to the coherent device 22, and on receipt of a corresponding snoop response from the coherent device 22, that snoop response is returned to the home node 32.

Figure 16:
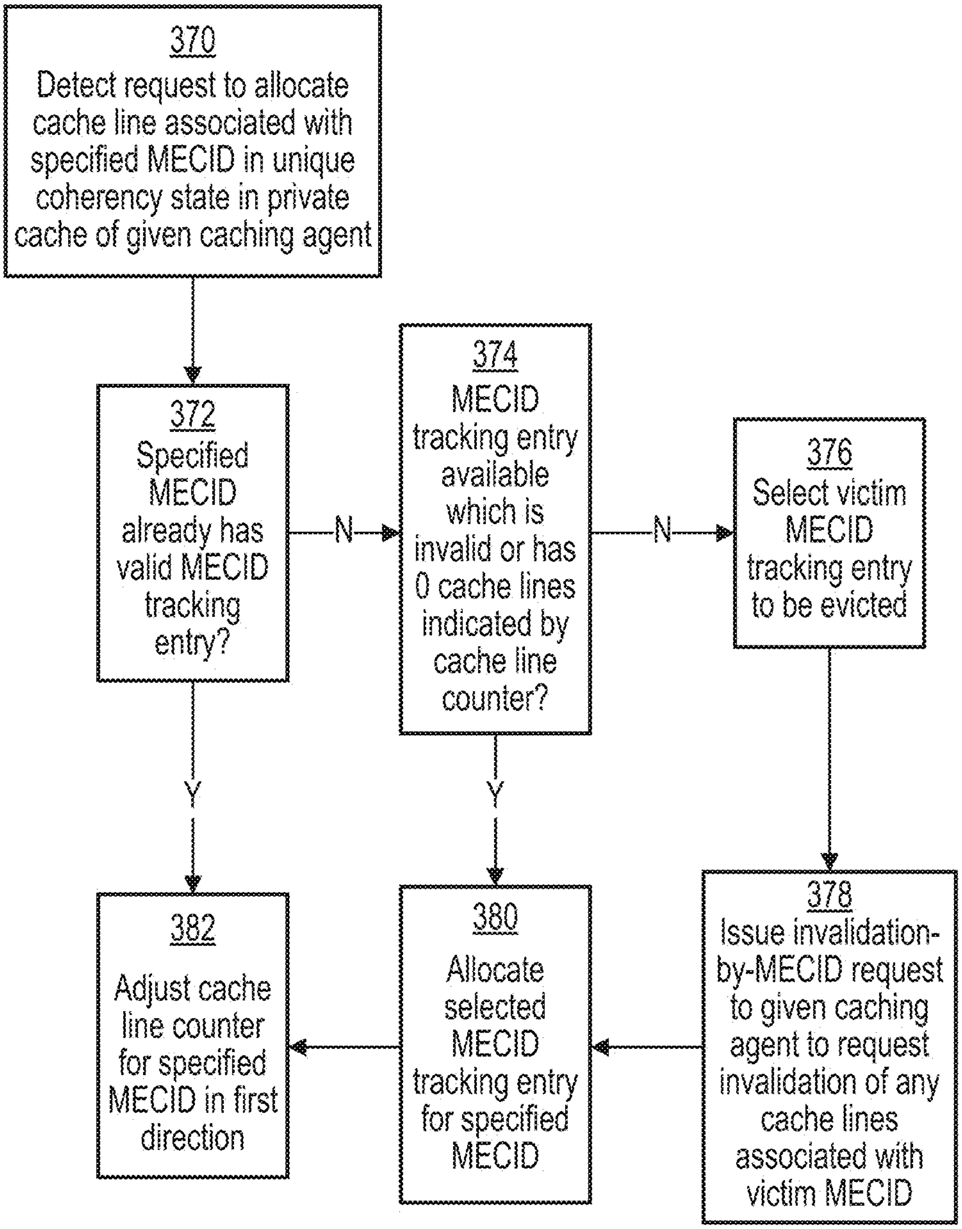
FIGS. 16 and 17 illustrate steps for maintaining the MECID-based snoop filtering information in an example which uses a counter to track cache lines for a given MECID held at the coherent device.
Figure 17:
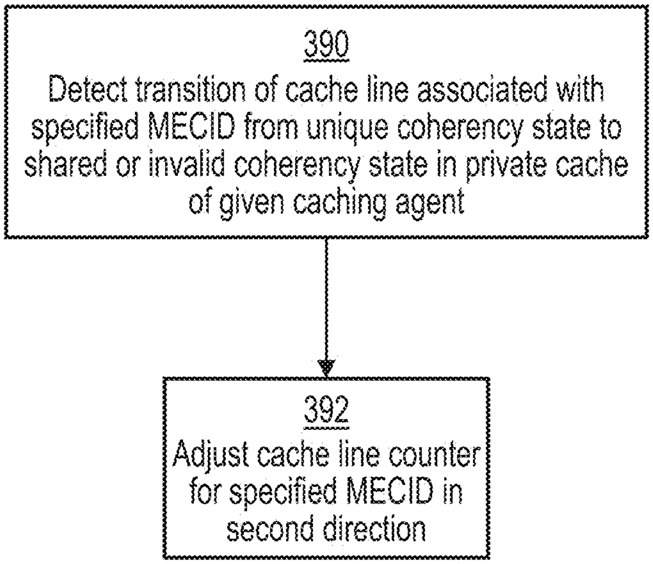

FIGS. 16 and 17 illustrate steps for hardware-maintenance of the snoop tracking information 126 at the root port's snoop filter 40. FIG. 16 illustrates steps performed in response to a request to allocate a cache line associated with a given MECID into the cache 24 of the coherent device 22. FIG. 17 illustrates steps performed in response to detecting a transition of a Unique cache line to a shared/invalid coherency state at the private cache 24 of the coherent device 22.

As shown in FIG. 16, in response to detection at step 370 of a request to allocate a cache line associated with the specified MECID in the unique coherency state in the private cache 24 of the given caching agent 22 associated with the root port's snoop filter 40, at step 372 snoop filtering circuitry 122 of the root port snoop filter 40 detects whether the specified MECID already has a valid MECID tracking entry 320. If there is no valid MECID tracking entry 320 for the specified MECID, then at step 374, the snoop filtering circuitry 122 determines whether a MECID tracking entry 320 is available which is invalid or has zero cache lines indicated by the corresponding cache line counter 326 as being held for the corresponding MECID in the private cache 24 of the given caching agent 22. If there is no such invalid/zero-cache-line-indicating entry, then at step 376 a victim entry 320 is selected for eviction (e.g. according to a replacement policy such as round robin or least recently used), and at step 378 an invalidation-by-MECID bus command is transmitted to the coherent device (given caching agent) 22 to request invalidation of any cache lines associated with the victim MECID previously assigned to the victim tracking entry 320. The cache line counter for the victim entry may be cleared to a default value (e.g. zero or a value midway in the counter's numeric range of the counter).

Having selected either an invalid/zero-cache-line-indicating tracking entry at step 374 or a victim entry following an eviction at steps 376, 378, at step 380 the selected MECID tracking entry 320 is allocated for the specified MECID that was specified by the request detected at step 370 (e.g. by updating the MECID field 322 of that entry). At step 382 the cache line counter for that entry is adjusted in a first direction (e.g. incremented). If at step 372 the specified MECID already had a valid entry 320, then similarly at step 382 the cache line counter for that entry is adjusted in a first direction (e.g. incremented).

As shown in FIG. 17, in response to detection at step 390 of a transition of a cache line associated with a specified MECID from the unique coherency state to the shared or invalid coherency state in the private cache 24 of the given caching agent 22, at step 392 the cache line counter 326 in the tracking entry 330 corresponding to the specified MECID is adjusted in a second direction (e.g. decremented). For example, step 390 may detect the transition based on a snoop response provided by the coherent device 22 or on a signal provided by the coherent device (independent of whether the coherent device 22 was snooped) indicating that the coherent device 22 has invalidated data from its cache 24.

Hence, with this approach, the hardware can track the occupancy of the private cache 24 of the device 22, to track which MECIDs may require snooping, and which MECIDs are snoop-not-required MECIDs for which there cannot be any valid data in the cache 24 of the coherent device 22, so that snoops can be suppressed to provide both a security and performance benefit.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 18:
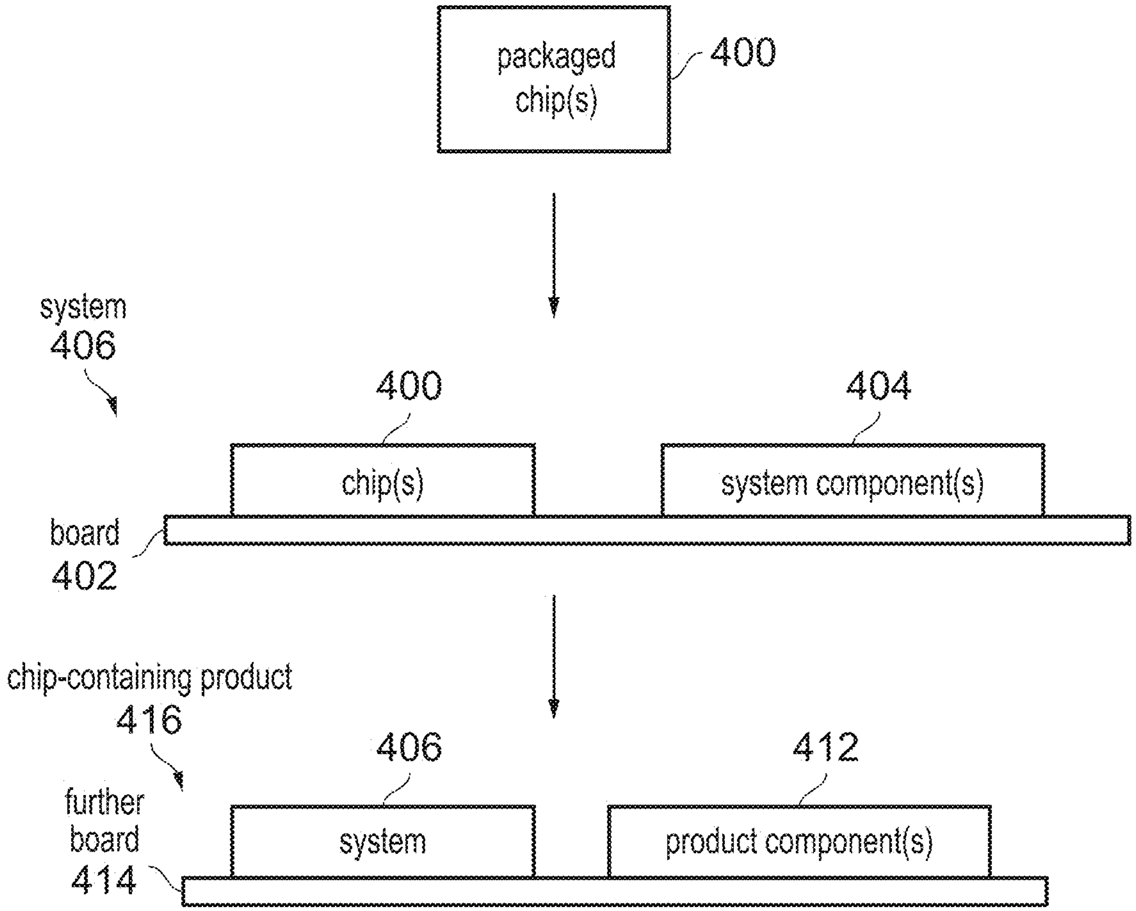
FIG. 18 illustrates a system and a chip-containing product.

As shown in FIG. 18, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

request receiving circuitry to receive a given memory system request specifying a target address in a given physical address space and a target memory encryption context identifier indicative of a selected memory encryption context associated with the memory system request, the selected memory encryption context comprising one of a plurality of memory encryption contexts associated with the given physical address space; and snoop filtering circuitry to determine whether a snoop request is to be transmitted to a given caching agent in response to the given memory system request; in which:

the snoop filtering circuitry is configured to:

determine, based on the target memory encryption context identifier of the given memory system request and on snoop filtering information associated with the given caching agent, whether the target memory encryption context identifier is a snoop-not-required memory encryption context identifier for the given caching agent; and in response to determining that the target memory encryption context identifier is a snoop-not-required memory encryption context identifier for the given caching agent, suppressing transmission of a snoop request to the given caching agent in response to the given memory system request.

2. The apparatus according to claim 1, in which the given caching agent comprises a coherent device.

3. The apparatus according to claim 1, in which the given memory system request comprises a snoop request targeting the given caching agent.

4. The apparatus according to claim 3, in which, in response to determining that the target memory encryption context identifier is a snoop-not-required memory encryption context identifier for the given caching agent, the snoop filtering circuitry is configured to return a no-data response in response to the snoop request, the no-data response indicating that a private cache of the given caching agent does not hold valid data for the target address.

5. The apparatus according to claim 1, in which the snoop filtering circuitry comprises a port for connecting a host system to one or more devices.

6. The apparatus according to claim 1, in which the snoop filtering circuitry comprises home node circuitry to manage coherency for a plurality of caching agents; and the given memory system request comprises a read/write request received from a requesting caching agent.

7. The apparatus according to claim 6, in which, in response to the given memory system request, the snoop filtering circuitry is configured to determine based on the snoop filtering information a snoop-not-required subset of the caching agents for which the target memory encryption context identifier is a snoop-not-required memory encryption context identifier, and to suppress transmission of snoop requests to the snoop-not-required subset of caching agents in response to the given memory system request.

8. The apparatus according to claim 6, in which the snoop filtering circuitry is configured to look up address-based snoop filtering information based on the target address of the given memory system request, to identify whether the target address is a snoop-required target address for the given caching agent; and in response to determining that the target address is a snoop-required target address for the given caching agent, the snoop filtering circuitry is configured to determine that a snoop request should be transmitted to the given caching agent in response to the given memory system request, even when the snoop filtering information is indicative of the target memory encryption context identifier being a snoop-not-required memory encryption context identifier for the given caching agent.

9. The apparatus according to claim 1, in which the snoop filtering information specifies one or more memory encryption context identifiers which cannot be regarded as a snoop-not-required memory encryption context identifier for the given caching agent.

10. The apparatus according to claim 1, in which the snoop filtering information comprises software-managed snoop filtering information.

11. The apparatus according to claim 10, in which the snoop filtering circuitry comprises programming interface circuitry to set the software-managed snoop filtering information in response to a programming request triggered by privileged software.

12. The apparatus according to claim 1, in which the snoop filtering information comprises hardware-managed snoop filtering information set by the snoop filtering circuitry based on monitoring of request traffic for the given caching agent.

13. The apparatus according to claim 1, in which the snoop filtering circuitry is configured to determine that the target memory encryption context identifier is a snoop-not-required memory encryption context identifier for the given caching agent, in response to determining that a cache line counter associated with the target memory encryption context identifier and the given caching agent indicates that a private cache of the given caching agent holds a non-zero number of cache lines associated with the target memory encryption context identifier.

14. The apparatus according to claim 13, in which the snoop filtering circuitry is configured to maintain, for the given caching agent, a set of cache line counters each associated with a corresponding memory encryption context identifier;

in response to detecting a request to allocate a cache line associated with a specified memory encryption context identifier to a private cache of the given caching agent in a unique coherency state, the snoop filtering circuitry is configured to adjust the cache line counter corresponding to the specified memory encryption context identifier in a first direction, the unique coherency state for a given cache line indicating that no other caching agent holds valid data for the given cache line; and in response to detecting an indication that a cache line associated with a specified memory encryption context identifier has transitioned from the unique coherency state to a non-unique coherency state in the private cache of the given caching agent, the snoop filtering circuitry is configured to adjust the cache line counter corresponding to the specified memory encryption context identifier in a second direction.

15. The apparatus according to claim 1, in which the snoop filtering information for the given caching agent comprises a set of snoop filtering indicators each associated with a respective memory encryption context identifier and indicating whether that memory encryption context identifier is a snoop-not-required memory encryption context identifier for the given caching agent.

16. The apparatus according to claim 1, in which the snoop filtering information comprises a set of memory encryption context identifier tracking entries for the given caching agent, each memory encryption context identifier tracking entry, when valid, specifying a corresponding memory encryption context identifier and information indicative of whether the corresponding memory encryption context identifier is a snoop-not-required memory encryption context identifier for the given caching agent.

17. The apparatus according to claim 16, in which in response to detecting a request capable of allocating data associated with a new memory encryption context identifier to a private cache of the given caching agent, when the new memory encryption context identifier is not already tracked using one of the set of memory encryption context tracking entries, the snoop filtering circuitry is configured to allocate one of the memory encryption context identifier tracking entries for the new memory encryption context identifier.

18. The apparatus according to claim 17, in which, in response to detecting that allocating one of the memory encryption context identifier tracking entries for the new memory encryption context identifier requires replacement of a memory encryption context identifier tracking entry previously allocated for a victim memory encryption context identifier, the snoop filtering circuitry is configured to trigger invalidation of any cache lines associated with the victim memory encryption context identifier from a private cache of the given caching agent.

19. The apparatus according to claim 1, comprising memory encryption/decryption circuitry responsive to a memory access request specifying a given address and a specified memory encryption context identifier, to perform encryption or decryption of data associated with the given address based on key information selected based on the specified memory encryption context identifier.

20. A system comprising:

the apparatus of claim 1, implemented in at least one packaged chip;

at least one system component; and a board, wherein the at least one packaged chip and the at least one system component are assembled on the board.

21. A chip-containing product comprising the system of claim 20 assembled on a further board with at least one other product component.

22. A non-transitory storage medium storing computer-readable code for fabrication of an apparatus comprising:

request receiving circuitry to receive a given memory system request specifying a target address in a given physical address space and a target memory encryption context identifier indicative of a selected memory encryption context associated with the memory system request, the selected memory encryption context comprising one of a plurality of memory encryption contexts associated with the given physical address space; and snoop filtering circuitry to determine whether a snoop request is to be transmitted to a given caching agent in response to the given memory system request; in which:

the snoop filtering circuitry is configured to:

determine, based on the target memory encryption context identifier of the given memory system request and on snoop filtering information associated with the given caching agent, whether the target memory encryption context identifier is a snoop-not-required memory encryption context identifier for the given caching agent; and in response to determining that the target memory encryption context identifier is a snoop-not-required memory encryption context identifier for the given caching agent, suppressing transmission of a snoop request to the given caching agent in response to the given memory system request.

23. A method comprising:

receiving a given memory system request specifying a target address in a given physical address space and a target memory encryption context identifier indicative of a selected memory encryption context associated with the memory system request, the selected memory encryption context comprising one of a plurality of memory encryption contexts associated with the given physical address space;

determining, based on the target memory encryption context identifier of the given memory system request and on snoop filtering information associated with a given caching agent, whether the target memory encryption context identifier is a snoop-not-required memory encryption context identifier for the given caching agent; and wherein the target memory encryption context identifier is determined to be a snoop-not-required memory encryption context identifier for the given caching agent;

in response to determining that the target memory encryption context identifier is a snoop-not-required memory encryption context identifier for the given caching agent, suppressing transmission of a snoop request to the given caching agent in response to the given memory system request.

* * * * *